United States Patent [19]

Kawakami et al.

[11] Patent Number: 5,497,180
[45] Date of Patent: Mar. 5, 1996

[54] IMAGE RECORDING APPARATUS FOR REPRESENTING A HALFTONE BY USE OF A PLURALITY OF RECORDED DOTS

[75] Inventors: Haruko Kawakami; Hidekazu Sekizawa, both of Yokohama; Naofumi Yamamoto, Tokyo, all of Japan

[73] Assignee: Kabushiki Kaisha Toshiba, Kawasaki, Japan

[21] Appl. No.: 71,000

[22] Filed: Jun. 4, 1993

[30] Foreign Application Priority Data

Jun. 4, 1992 [JP] Japan .................................. 4-144581

[51] Int. Cl.⁶ .................................................. H04N 1/21
[52] U.S. Cl. ........................................ 347/131; 347/253
[58] Field of Search ............................ 346/108, 107 R, 346/160, 76 L, 1.1; 358/298, 296, 300, 302, 133, 136; 347/251, 253, 240, 131

[56] References Cited

U.S. PATENT DOCUMENTS

| | | |
|---|---|---|
| 4,803,496 | 2/1989 | Kawakami et al. . |
| 4,926,251 | 5/1990 | Sekizawa et al. . |
| 5,043,809 | 8/1991 | Shikakura et al. ................. 358/133 |

FOREIGN PATENT DOCUMENTS 3-204273  9/1991  Japan .

OTHER PUBLICATIONS

Toshiharu Kurosaura, et al. The Journal of the Institute of Television Engineers of Japan, A Multi level Algarithm for High Quality Digital Halftoning; vol. 44, No. 5, pp. 608/614; 1990.

Hiroaki Kotera; The Journal of The Institute of Television Engineers of Japan, Smoothing Effect in Gray Characteristics Using a Pseuda–Noise Method vol. 40, No. 11, pp. 1113/1119; 1986.

*Primary Examiner*—Mark J. Reinhart
*Attorney, Agent, or Firm*—Oblon, Spivak, McClelland, Maier & Neustadt

[57]  ABSTRACT

An image recording apparatus comprises an unequal interval quatization circuit for quantizing at an unequal interval an input multilevel image signal to prevent at least one signal having a tone level at which a recording density is unstable from being outputted, a circuit for calculating a difference between an unequal-interval-quantized signal and the input image signal, a buffer memory for temporarily storing the difference, a multiplexer for multiplying a recorded signal with a weight coefficient, an adder for adding a resultant signal from the multiplier to the input image signal, and a printer for recording an image, using the quantized signal as a record signal.

18 Claims, 16 Drawing Sheets

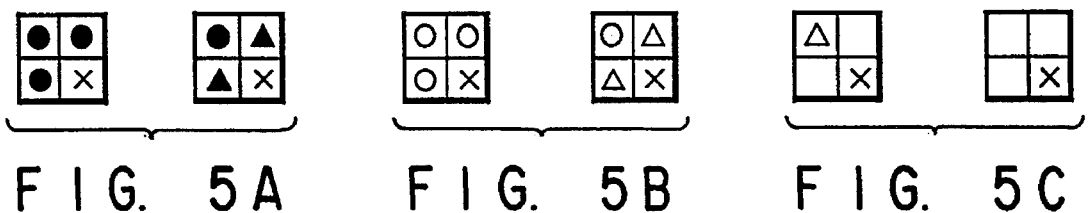
F I G. 5A  F I G. 5B  F I G. 5C
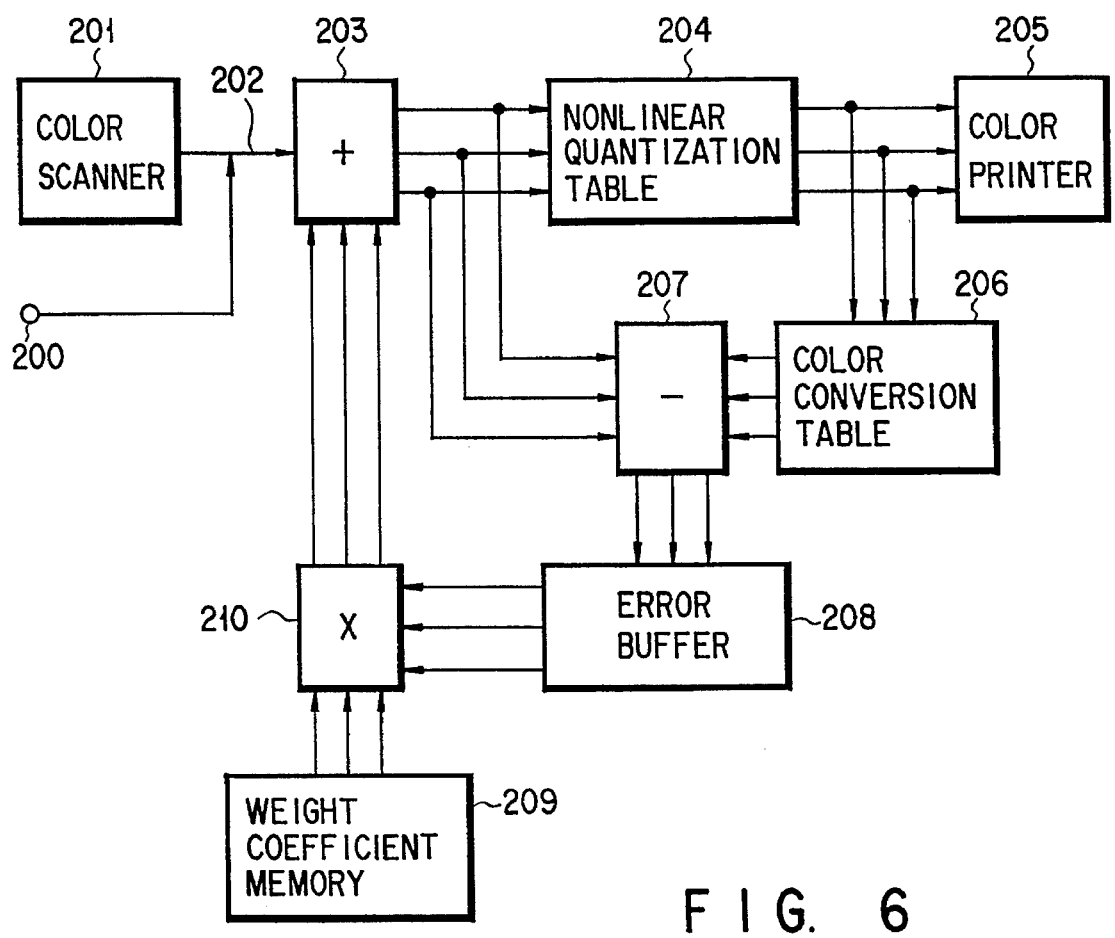
F I G. 6

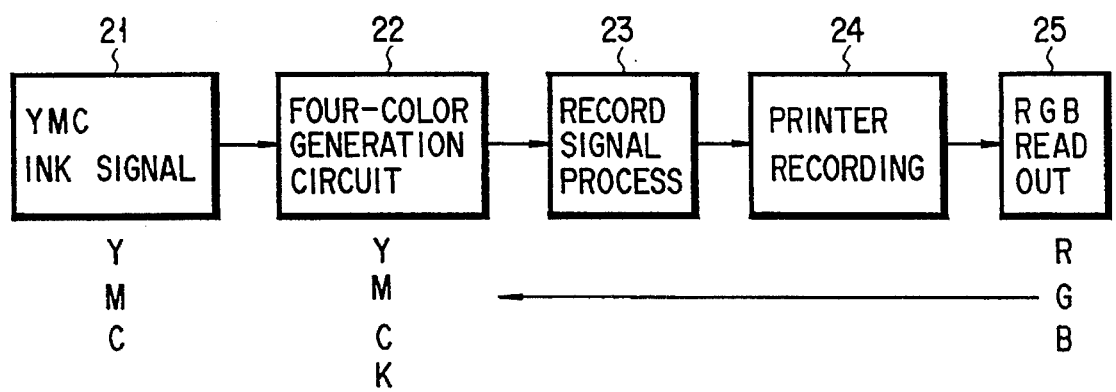
F I G. 8
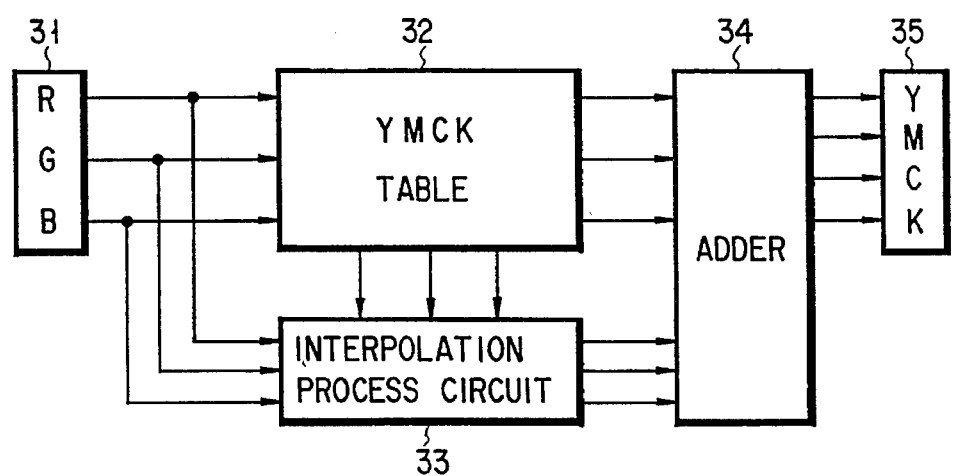
F I G. 9

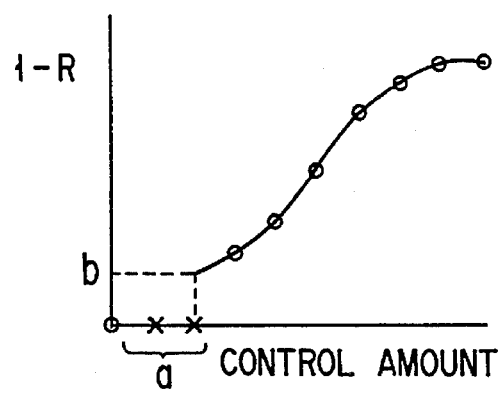
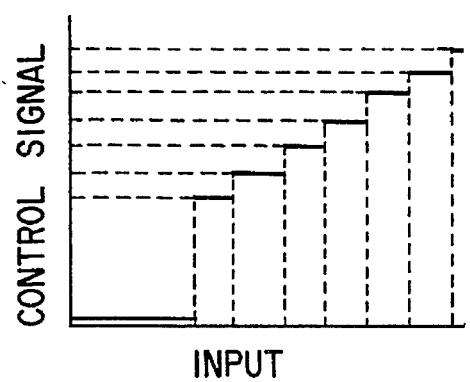
FIG. 10A         FIG. 10B
|   |   |   |
|---|---|---|
| A | B | C |
| D | × |   |
FIG. 11
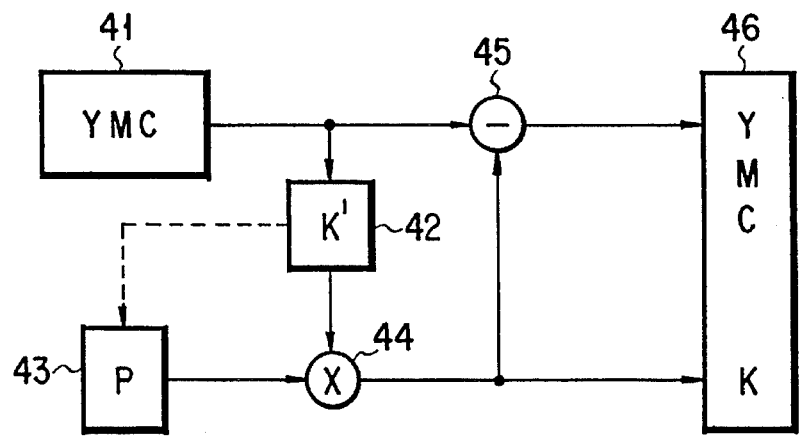
FIG. 12

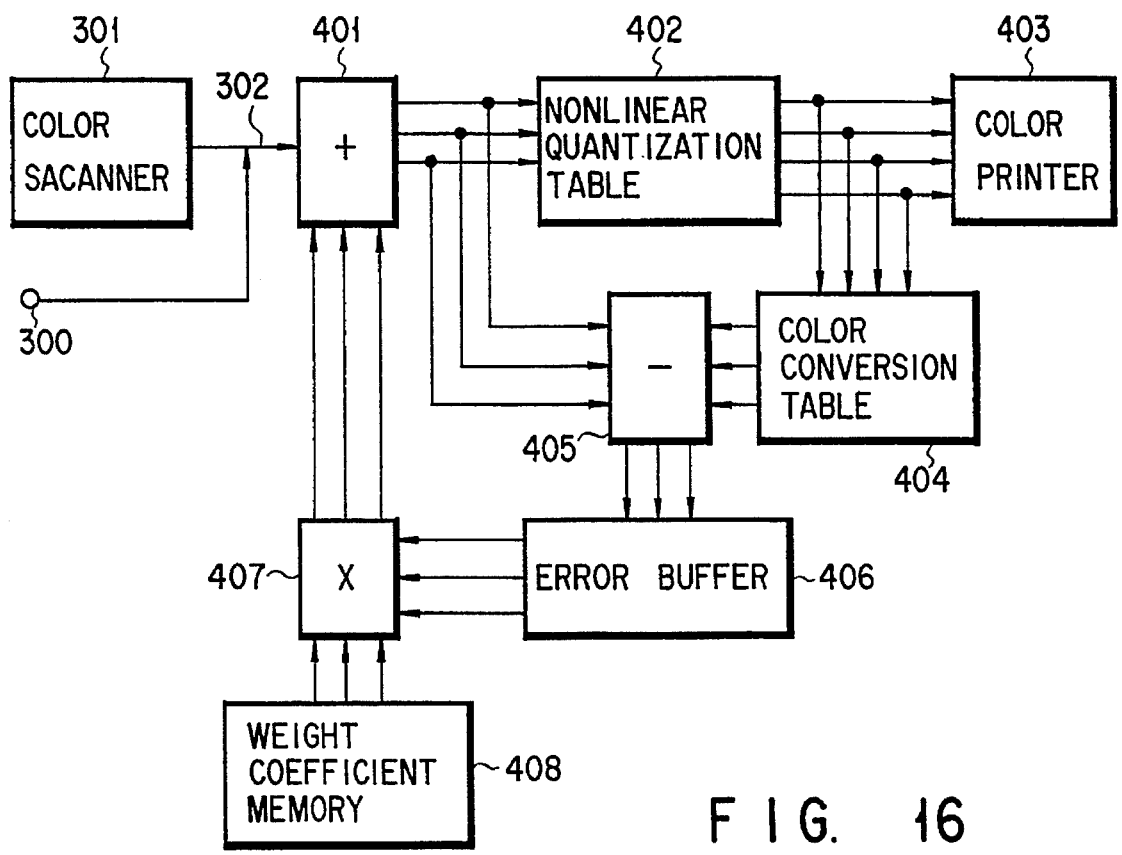
F I G. 16
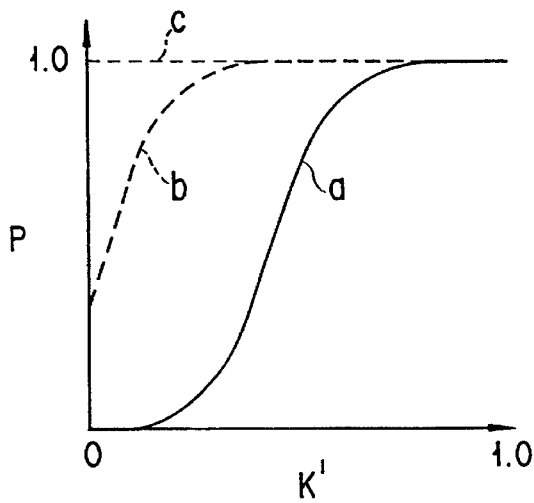
F I G. 18
F I G. 19

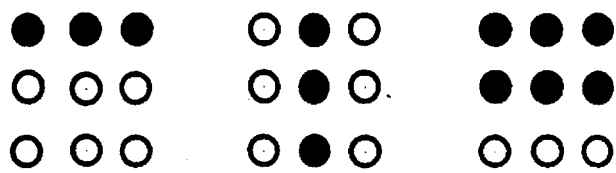
PATTERN OF CHARACTER PORTION
F I G. 21A
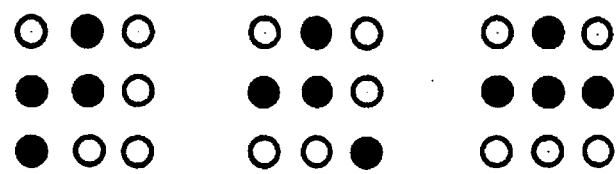
PATTERN NEAR CHARACTER PATTERN
F I G. 21B
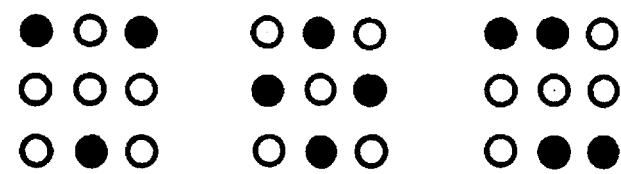
PATTERN OF HALFTONE IMAGE PORTION
F I G. 21C

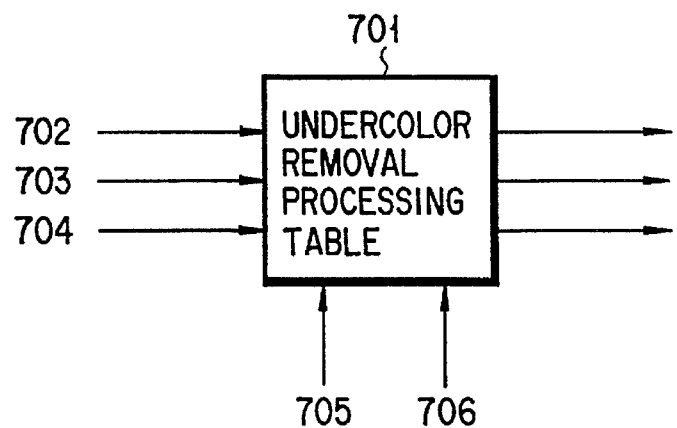
F I G. 22
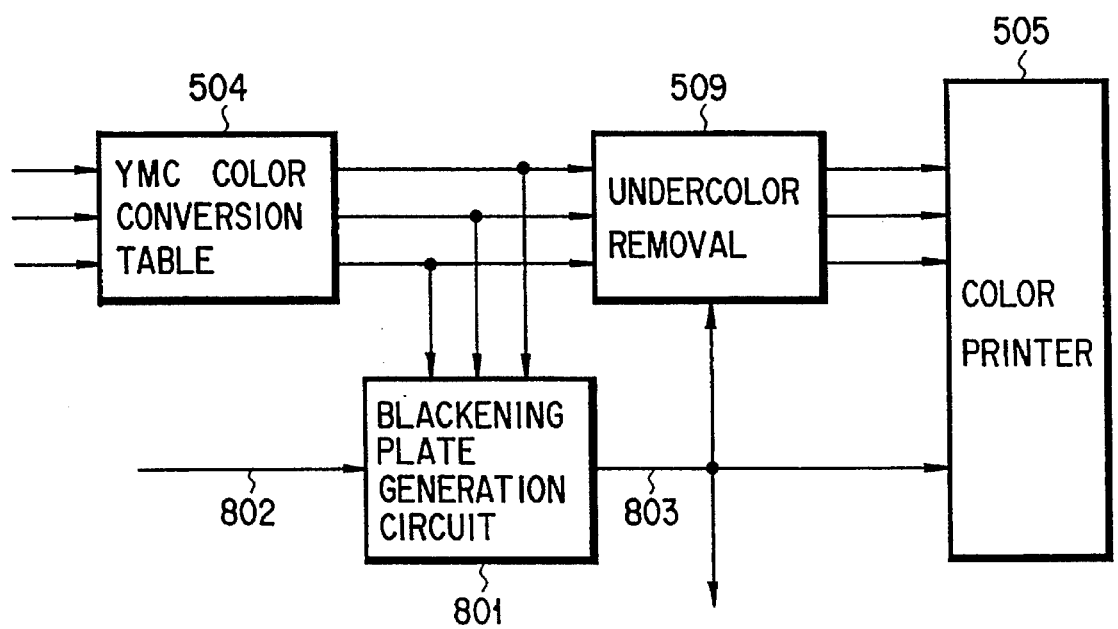
F I G. 23

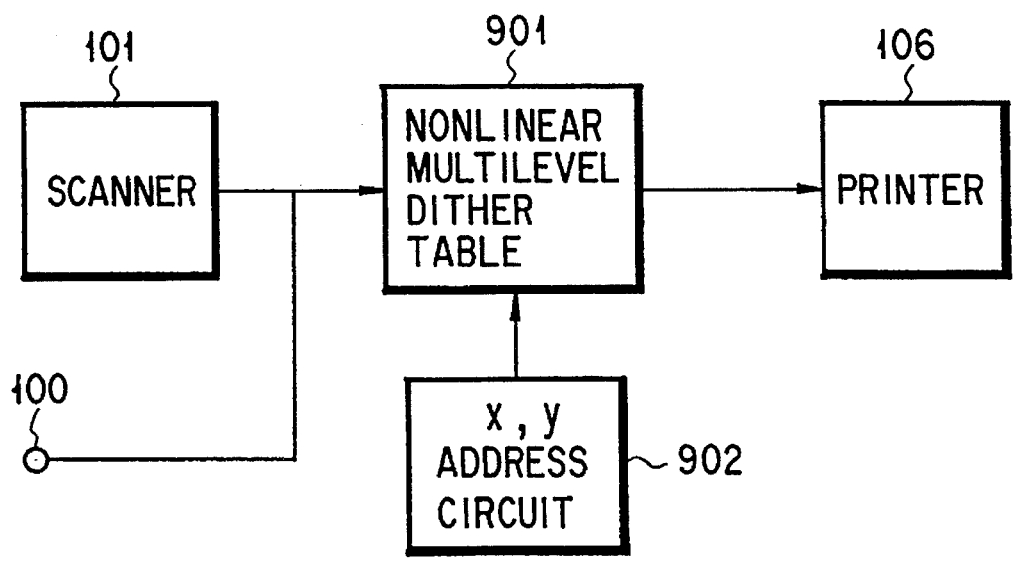
F I G. 25
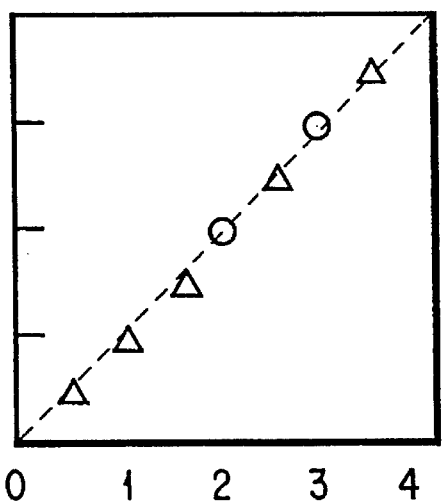
F I G. 26

FIG. 27

| 0 | 1 | 2 | 3 | 4 |
|---|---|---|---|---|
| 0 0 / 0 0 | 0 0 / 0 2 | 2 0 / 0 2 | 2 0 / 2 2 | 2 2 / 2 2 |

| 5 | 6 | 7 | 8 |
|---|---|---|---|
| 3 2 / 2 3 | 3 3 / 3 3 | 4 3 / 3 4 | 4 4 / 4 4 |

FIG. 28

X Y ADDRESS CIRCUIT — 902

→ 901

INPUT IMAGE SIGNAL →

| | 2n-1, 2m-1 | 2n, 2m-1 | 2n-1, 2m | 2n, 2m |
|---|---|---|---|---|
| 0 | 0 | 0 | 0 | 0 |
| 1 | 0 | 0 | 0 | 2 |
| 2 | 2 | 0 | 0 | 2 |
| 3 | 2 | 0 | 2 | 2 |
| 4 | 2 | 2 | 2 | 2 |
| 5 | 3 | 2 | 2 | 3 |
| 6 | 3 | 3 | 3 | 3 |
| 7 | 4 | 3 | 3 | 4 |
| 8 | 4 | 4 | 4 | 4 |

IMAGE RECORDING APPARATUS FOR REPRESENTING A HALFTONE BY USE OF A PLURALITY OF RECORDED DOTS

BACKGROUND OF THE INVENTION

1. Field of the Invention

The present invention relates to an image recording apparatus used in a copy machine or printer.

2. Description of the Related Art

An error diffusion method or error distribution method is known as a method of processing an input image signal to record a halftone image. The error diffusion method is a technique for performing binary coding process of an image signal so as to minimize a density difference between an input image signal and an output image signal. This technique is very effective to output both a halftone image and a high-definition image in a printer having only binary representation. A method of inputting a signal processed by this error diffusion method to a printer and recording the processed signal at the printer is called error diffusion recording. This error diffusion recording has a disadvantage in that a texture inherent to a smooth halftone image becomes conspicuous.

To compensate for the drawback of this error diffusion method, a multilevel error diffusion method and a multilevel correlative density assignment of adjacent pixels ("multilevel algorithm for high quality pseudo halftoning", Proceedings of Television, Vol. 44, No. 5, pp. 608–614 (1990)) which is similar to the multilevel error diffusion method are known. In these techniques, however, a tone gradation tends to be conspicuous in a highlighted or high-density portion whose recording is unstable. A pseudo contour is formed in such a portion to result in a poor image.

To solve this problem, a method of adding random noise to an image signal (e.g., "Smoothing Effect in Gray Scale Characteristics Using a Pseudo-Noise Method", Proceedings of Television, Vol. 40, No. 11, p. 1113 (1986)). According to this method, however, the texture of a multilevel recording portion becomes different from that of the portion added with random noise, resulting in a poor image.

As a method of correcting a tone gradation, a technique for correcting the levels of a signal to smooth levels in advance, using a ROM table is known. In this tone correction, however, when a change in density occurs in a printer deterioration over time, the pseudo contour tends to be formed in the highlighted or high-density portion.

In error diffusion recording, when an input image signal is subjected to undercolor removal, snow noise tends to be conspicuous. Published Unexamined Japanese Patent Application No. 3-204273 describes a technique for determining a condition in selecting each color to prevent colors from generating at random, thereby preventing snow noise. In a practical color printer, however, color misregistration between colors to be printed occurs to result in a random color combination in stacking the colors to actually print an image under a specific condition for a color selection. Snow noise is not always reduced. When four-color printing is performed after processing such as undercolor removal, a low-density recording signal is frequently generated to form a number of non-recorded dots in a system in which low-density recording is unstable. As a result, color reproduction is often degraded.

In a color copy machine or color printer, a positional error occurs between ink colors in a color printing unit. Black characters are blurred, and the color of a halftone portion such as a gray or skin-colored portion changes depending on different positions within the printed paper sheet or different paper sheets. To prevent this, a technique for using a screen angle in color halftone reproduction to obtain different screen angles for all colors, locally causing an average positional error any time, and stabilizing color reproduction is known. According to this technique, image degradation in a character portion greatly occurs, and moire noise is undesirably generated.

To improve the quality of a character portion, Published Unexamined Japanese Patent Application No. 63-240175 discloses a technique for extracting a character and black regions of a color original, performing 100% undercolor removal of only a black character region, and performing undercolor removal of less than 100% of the remaining region. In practice, however, it is difficult to accurately extract the character region in 100%. When the character region is erroneously identified, e.g., when a halftone image region is erroneously identified as the character region, 100% undercolor removal causes a change in color or an increase in snow noise. It is difficult to set an extreme undercolor removal ratio (i.e., blackening ratio). A color variation caused by a relative positional error in an ink color of the printer occurs in the halftone image region, and moire noise cannot be reduced. When undercolor removal of a region (i.e., a halftone image region occupying an almost print area) except for the character region is performed at a low ratio, an ink consumption amount cannot be reduced. In addition, every time the undercolor removal ratio changes, the color changes in strict color reproduction. It is, therefore, difficult to variably set the undercolor removal ratio.

As described above, in the conventional error diffusion recording technique, texture noise inherent to binary error diffusion recording is generated, and pseudo contour noise at discontinuous points in multilevel recording is generated. Even if processing for correcting printer tone characteristics is performed, the pseudo contour caused by variations in tone characteristics due to the deterioration over time is undesirably formed.

In the conventional color image recording apparatus, when four-color printing is performed in error diffusion recording, snow noise caused by color noise generated at random is generated. In addition, it is difficult to faithfully reproduce the colors in a printer having unstable tone characteristics, and color reproduction by undercolor removal processing is degraded.

In the conventional color image recording apparatus, a character portion tends to be blurred. When the technique having different undercolor removal ratios in the character and halftone image regions is used, a change in color in the character region occurs and snow noise increases due to erroneous identification of the region. In addition, the ink consumption amount cannot be reduced.

SUMMARY OF THE INVENTION

It is an object of the present invention to provide an image recording apparatus capable of performing image recording almost free from pseudo contour noise and a change in texture, while using error diffusion recording.

It is another object of the present invention to provide an image recording apparatus capable of performing faithful color reproduction even in use of error diffusion recording, eliminating instability of printer tone characteristics, and performing four-color image recording almost free from snow noise.

It is another object of the present invention to provide an image recording apparatus capable of preventing color blurring and snow noise in a character region and performing color image recording with a small ink consumption amount.

According to a first aspect of the present invention, there is provided an image recording apparatus, which includes an unequal interval quantization circuit (a nonlinear quantization circuit) in an error diffusion processing section, for quantizing an image signal at an unequal interval to eliminate an unstable recording level.

According to a second aspect of the present invention, there is provided an image recording apparatus, wherein multilevel error diffusion processing for each color of a four-color signal obtained upon correction including undercolor removal of a three-color signal in color recording or a read three-color signal so as to reduce snow noise of colors in error diffusion recording and to reduce an ink consumption amount even if positional errors of all the colors occur in a printing unit, thereby obtaining a color recording signal.

To achieve faithful color reproduction and perform undercolor removal having a large degree of freedom, a three-color signal is converted into a four-color signal, a table representing a relationship with the four-color signal as the recording signal is prepared from a signal measured by a read system upon actual printing at a printing unit or a signal estimated to be obtained from the system, and the three-color signal is converted into the four-color signal from this table.

To solve the problem caused by an increase in snow noise because low-density level recording is frequently performed due to undercolor removal or blackening processing, when a blackening amount is small, three-color printing is performed, when the blackening amount increases, four-color printing is performed.

The multilevel error diffusion processing may be multilevel error diffusion processing from which assignment to the low-density level corresponding to the unstable recording state is canceled, or multilevel error diffusion recording processing in which a weighting coefficient is caused to correspond to a recording level in a feedback loop of the low-density level corresponding to the unstable recording state.

According to a third aspect of the present invention, there is provided an image recording apparatus comprising a correction unit for performing correction processing of a three-color input image signal including black on the basis of a blackening amount and a discrimination result of a character/line image region and a halftone image region to obtain a four-color image signal, an error diffusion processing unit for performing binary or multilevel error diffusion processing of the four-color image signal obtained from the correction unit, and a color recording unit for recording a color image using, as a recording signal, the color image signal processed by the error diffusion processing unit, wherein the correction unit sets a higher ratio of substitution to a black signal for the character/line image region than that for the halftone image region, the ratio of substitution to the black signal for the halftone image region being lowered in accordance with a decrease in blackening amount.

In noise such as pseudo contour noise caused by the recording level corresponding to the unstable recording state, the tone characteristics immediately change upon tone correction, a tone degradation occurs in the tone characteristics, a noise reduction effect by tone correction cannot be obtained, and noise reduction is difficult. To the contrary, according to the first aspect of the present invention, when the recording control level is quantized by threshold processing using the multilevel in error diffusion recording, the recording signal is generated using the unequal interval (nonlinear quantization) characteristics. The tone can be expressed without using the recording level region (density region) corresponding to the unstable recording state. Therefore, stable recording can be performed.

The conversion table representing the relationship between the three- and four-color signals is prepared for color correction in color reproduction, and the three-color signal is converted into the four-color signal. No change in color before and after processing such as undercolor removal is generally required. The color change component is corrected using this conversion table, and any undercolor removal can be performed. In addition, a printer is not generally good at low-level printing, and snow noise is increased. If a possibility of performing low-level recording is present, i.e., when a blackening amount is small, blackening recording is not performed, but three-color recording is performed to prevent low-level recording. Quantization using the nonlinear quantization characteristics is performed in multilevel error diffusion recording processing to suppress generation of a low-level signal, thereby reducing snow noise.

According to the third aspect, the amount of ink actually used is determined by the image region identification signal and the blackening amount. For this reason, 100% undercolor removal is performed in the character region, and a clear image free from color blurring can be obtained. When the blackening amount is large, almost 100% undercolor removal is performed in the halftone image region to contribute to a decrease in ink consumption amount. When the blackening amount is small, almost only three-color printing is performed to suppress snow noise. The weight coefficient matrix is changed in error diffusion recording of the character region requiring high-definition recording and a recording color requiring high-definition recording. Therefore, both high-definition recording and smoothness in the halftone image region can be satisfied.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5C are views for explaining an influence of an adjacent pixel;

FIG. 6 is a block diagram showing an image recording apparatus according to a third embodiment of the present invention;

FIG. 8 is a view for explaining a principle of preparing a color conversion table;

FIG. 9 is a view for explaining a method of realizing a color conversion table by an interpolation scheme;

FIGS. 10A and 10B are views showing the tone characteristics of a printer and the input/output characteristics of a nonlinear quantization table;

FIG. 11 is a view showing a weight coefficient matrix in an error diffusion method;

FIG. 12 is a view for explaining a four-color signal generating process shown in FIG. 8;

FIG. 16 is a block diagram showing an image recording apparatus according to a sixth embodiment of the present invention;

FIG. 18 is a graph showing characteristic curves of the blackening ratio P;

FIG. 19 is a view showing a weight coefficient matrix in an error diffusion method;

FIGS. 21A to 21C are views for explaining arrangements of patterns in pattern matching;

FIG. 22 is a block diagram showing the arrangement of a unit for switching an under color removal method according to an eighth embodiment of the present invention;

FIG. 23 is a block diagram showing the arrangement of a unit for switching an under color removal method according to a ninth embodiment of the present invention;

FIG. 25 is a block diagram showing an image recording apparatus according to an eleventh embodiment of the present invention;

FIG. 26 is a view showing a recording multilevel of a printer;

FIG. 27 is a view showing multilevel dither outputs; and

FIG. 28 is a view showing the content of a nonlinear multilevel dither table.

DETAILED DESCRIPTION OF THE PREFERRED EMBODIMENTS

Embodiments of the present invention will be described below with reference to the accompanying drawings.

Figure 1:
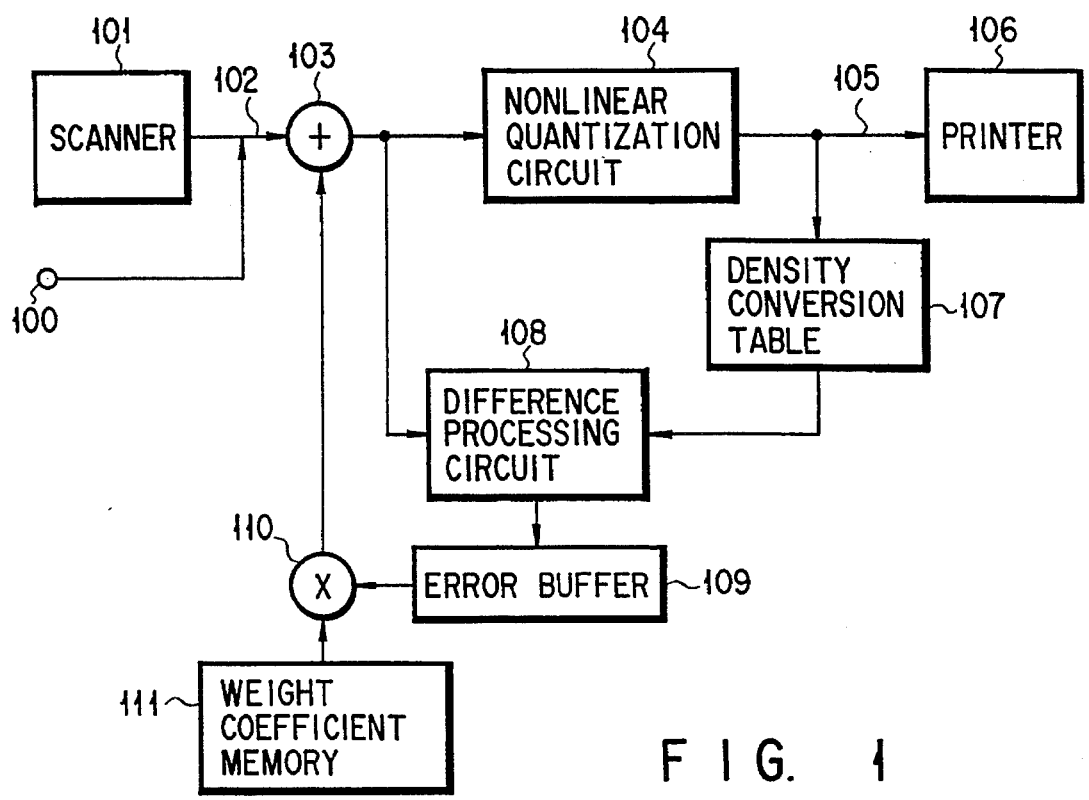
FIG. 1 is a block diagram showing an image recording apparatus according to a first embodiment of the present invention.

FIG. 1 is a block diagram showing an image recording apparatus according to the first embodiment of the present invention. When this image recording apparatus is used as a copy machine, an image signal obtained by reading an original by a scanner 101 is used as an input image signal 102. When the image recording apparatus is used as a printer apparatus, an image signal input from an input terminal 100 is used as the input image signal 102. The input image signal 102 is input to an adder 103, and an error between a signal to be recorded (to be described later) and an output image signal is added to the input image signal 102. An output signal from the adder 103 is input to an unequal interval quantization circuit (a nonlinear quantization circuit) 104.

Figure 2:
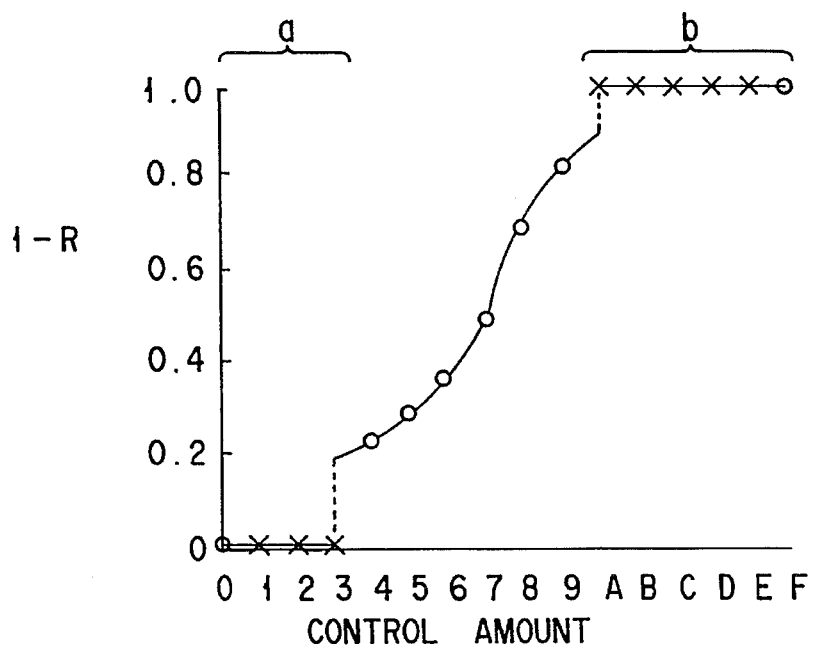
FIG. 2 is a graph showing tone characteristics of a printer.

A laser printer generally exhibits tone characteristics shown in FIG. 2. In FIG. 2, the ordinate represents 1–R (R: reflectance), and the abscissa represents a control signal (recording signal) to be supplied to a printer. At this time, a case wherein the control signal changed from 0 to F in hexadecimal notation will be described below. The control signal is considerably changed at a point of control amount "3" (immediately after a density level region corresponding to a highlighted portion a) or a point of control amount A (immediately before a density level region corresponding to a solid density region b) depending on atmospheric conditions, latent image conditions (variations in laser power) of electrophotography, and development conditions. For this reason, even when these points are output as a recording signal 105, these points are not actually recorded by a printer 106, or these points are undesirably connected to each other. Therefore, recording is often performed at a density considerably different from that of the recording signal 105.

The nonlinear quantization circuit 104 is constituted by, e.g., an ROM table, and generates a control signal in a density level region except for control amounts "3" and "A". For example, control signals indicated by ○ in FIG. 2, i.e., only signals having 8 types of control amounts 0, 4, 5, 6, 7, 8, 9, and F are generated. More specifically, upper 4 bits of 8 bits of an output of the adder 103 are input to a ROM (16 addresses), and the ROM outputs control signals having control amounts 0, 0, 0, 0, 4, 5, 6, 7, 8, 9, F, F, F, F, F, and F.

When these control signals are input to the printer 106 to perform recording, a density shown in FIG. 2 is obtained as an actual density. For this reason, an error between the density of the output signal from the adder 103 and the density of actual printing must be calculated by a density corrected by the tone characteristics (FIG. 2) of the printer 106. The output signal from the adder 103 is converted into a density signal of actual printing by using the tone characteristics in FIG. 2 as a density conversion table 107. The density conversion table 107 has a 4-bit (16 addresses) input and an 8-bit output.

An error between the output signal from the adder 103 and the signal converted into the signal corresponding to an actual printing density and output from the density conversion table 107 is calculated by a difference processing circuit 108, and the resultant value is input to an error buffer 109 capable of storing the data of a 2-line error signal. A product of the error signal stored in the error buffer 109 and a weight coefficient matrix, output from a coefficient memory 111, for error diffusion processing is calculated by a multiplier 110, and the error is input to the adder 103.

Figures 3, 4:
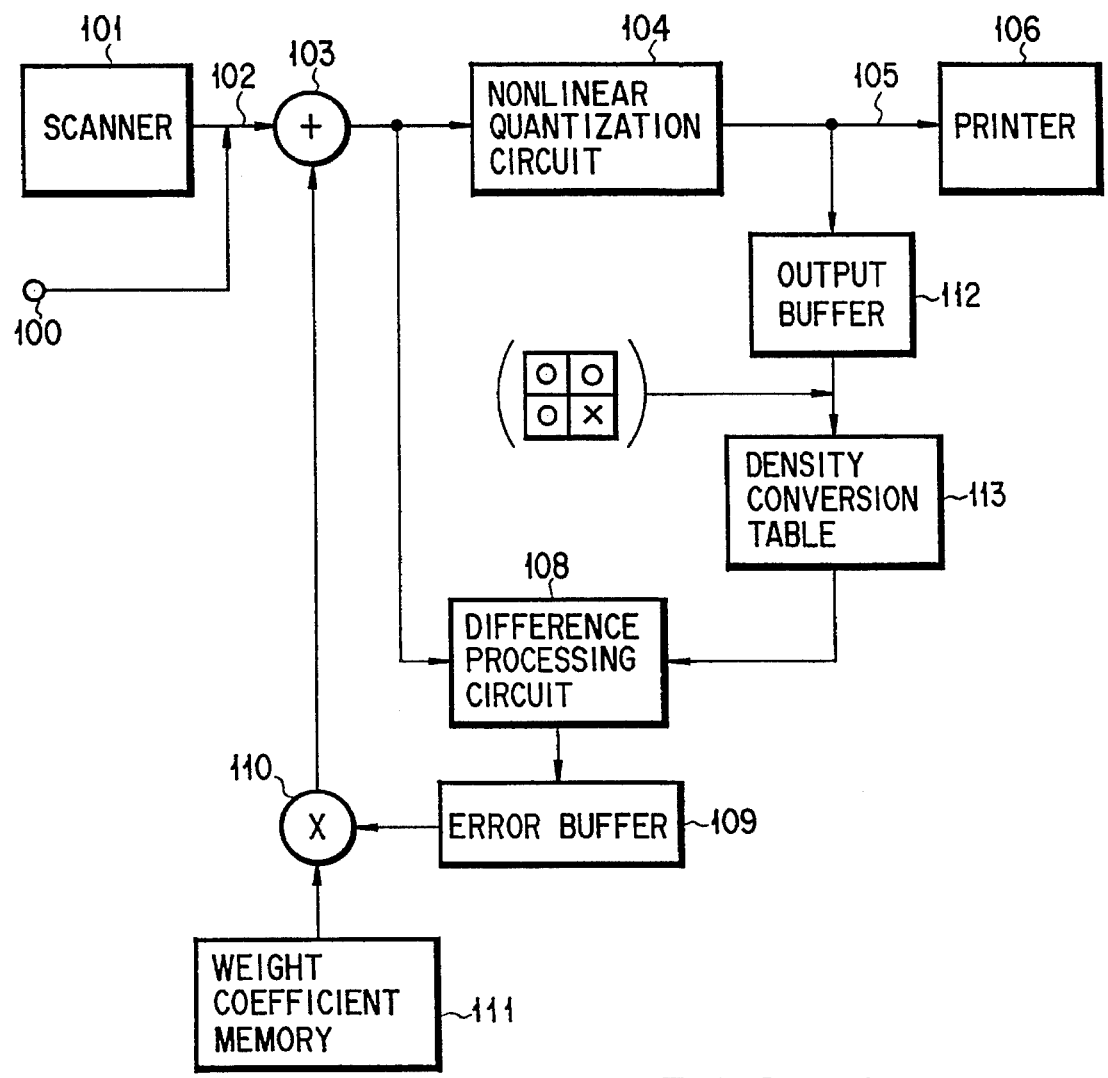
FIG. 3 is a view showing a weight coefficient matrix in an error diffusion method.
FIG. 4 is a block diagram showing an image recording apparatus according to a second embodiment of the present invention.

The weight coefficient matrix is constituted by four pixels as shown in FIG. 3, and coefficients A, B, C, and D are 1/16, 5/16, 3/16, and 7/16, respectively. An error Em-k,n-p having occurred ahead of an input signal fmn by a pixel (k,p) is weighted with the weight coefficient matrix of a coefficient αkp, and the weighted error is added to input image signal fmn. The resultant value is defined as a correction value f'mn of the next pixel, and the correction value f'mn is quantized at an unequal interval by the unequal interval quantization circuit, i.e. nonlinear quantization circuit 104. At this time, the correction value f'mn is expressed by equation (1). An error Emn is a difference between the correction value f'mn and an output density signal, i.e., an output signal Gmn from the density conversion table 107, and is expressed by equation (2).

$$f'mn = fmn + \left\{ 1/\sum_{k,p} \alpha kp \right\} \sum_{k,p} \alpha kp Em - k, n - p \quad (1)$$

$$Emn = f'mn - Gmn \quad (2)$$

In this manner, density level regions a and b shown in FIG. 2 and representing recording characteristics having an unstable tone are not used in the nonlinear quantization circuit 104, and the printer 106 can have recording characteristics having a smooth tone by the error diffusion recording. If the error diffusion processing is not performed, noise such as pseudo contour noise is generated due to a density difference caused by a tone degradation in one pixel of the nonlinear quantization circuit 104, thereby resulting in a very poor image. When the error diffusion processing of equations (1) and (2) is performed, an error generated at one dot is diffused and distributed through several pixels, and the density error of each pixel can be corrected. For this reason, a pseudo contour is rarely formed.

Intermediate-level signals often occupy a large area in an halftone image. However, a contrast of a tone difference is small because a control signal is distributed to a large number of levels in each period of intermediate levels. Therefore, texture noise unique to error diffusion recording is rarely conspicuous.

Although tone differences locally occur because tones are not used in a low-density level region and a high-density level region which are unstable density level regions of the printer 106, a contrast of the error diffusion recording is smaller than that of binary error diffusion recording, and texture noise is rarely conspicuous in the error diffusion recording.

In electrophotographic recording, tone characteristics vary depending on exposure conditions or development conditions. In this case, a pseudo contour is rarely formed because the most unstable density level region which easily varies is not used. Although an entire density varies due to a variation in tone characteristics of the printer 106, the variation in density can be neglected while a large variation in tone characteristics does not occur because the variation in density entirely occurs.

In this embodiment, a tone is corrected by the density conversion table 107 while the printer 106 has nonlinear tone characteristics inherent to the printer 106. With the above arrangement, a tone control circuit incorporated in the printer 106 can easily be realized because highly accurate tone correction can be performed by using a coarse control signal in the printer 106. For example, when multilevel control is realized by controlling the pulse width of a laser beam emitted from a laser, the tone control circuit is not operated at a very high speed, and a clock frequency need not be increased to an unnecessary level. Therefore, the tone control circuit can be realized by a low-cost element.

As a modification of the first embodiment, an output signal from the nonlinear quantization circuit 104 is directly input to the difference processing circuit 108 without passing through the density conversion table 107 to calculate an error, and the output signal from the density conversion table 107 may be corrected such that a reverse table of the density conversion table 107, i.e., a table for correcting the tone characteristics in FIG. 2, more specifically, a correction table for dividing a (1–R) signal of the ordinate at equal intervals to obtain control signals corresponding to the divided signals, is inserted before the printer 106. In this arrangement, tone correction can also be performed.

However, in order to achieve satisfactory tone correction in the above arrangement, the number of bits of a control signal from the printer 106 must be larger than the number of output bits from the nonlinear quantization circuit 104. In addition, the modification is susceptible to a variation in tone characteristics compared with the first embodiment. In other words, when quantization is performed by a (1–R) signal of the ordinate, a density level region close to a density level region having an unstable recording state may be selected. An advantage of the above modification is that versatility for various printers is improved because a correction table is only inserted between the input portion of the recording signal 105 and the printer 106.

FIG. 4 is a block diagram showing the second embodiment of the present invention. Tone characteristics shown in FIG. 2 are tone characteristics at one dot of a printer 106. When recording is actually performed by the printer 106, more specifically, a density level is changed depending on a recording mode of an adjacent dot. In other words, in a case wherein a dot (indicated by ×) to be currently printed is surrounded by solid density pixels (indicated by ●) or quasi-solid pixels (indicated by ▲) as shown in FIG. 5A, in a case wherein the dot is surrounded by intermediate density pixels (indicated by ○) or pixels (indicated by △) as shown in FIG. 5B, and in a case wherein the dot is surrounded by one low density pixel (indicated by △) or is not surrounded as shown in FIG. 5C, tone characteristics are slightly different from the characteristics shown in FIG. 2.

In this embodiment, a recording signal 105 from a nonlinear quantization circuit 104 is input to an output buffer 112, and an output signal is read out from the output buffer 112 in a combination of 2×2 pixels. One pixel of the recording signal 105 is expressed by four bits, and the 2×2 pixels have 16 bits. Therefore, a density conversion table 113 has a 16-bit address unlike the first embodiment.

The density conversion table 113 stores all combinations of density levels in combinations of 2×2 pixels, and an output signal from the output buffer 112 is converted into a signal corresponding to an actual printing density. As in the first embodiment shown in FIG. 1, a difference between the converted signal and an output signal from an adder 103 is calculated by an difference processing circuit 108. The arrangement of other parts of the second embodiment is the same as that of the first embodiment. In this manner, a variation in density caused by the influence of adjacent pixels is corrected, and stable and accurate tone characteristics can be obtained.

The third embodiment applied to a color printer will be described below with reference to FIG. 6. The color of a color image is expressed by stacking color inks in a color printer 205. When tone characteristics as shown in FIG. 2 are observed, the characteristics often vary depending on the density of an ink which is recorded for the first time. That is, the tone characteristics vary depending on a manner of stacking color inks. According to the third embodiment, tones having different tone characteristics are corrected by the combination of the colors of the color inks, and combinations which reproduce unstable colors having increased snow noise are removed, thereby realizing stable and smooth color reproduction having reduced noise.

An input color image signal 202 input from the color scanner 201 or an input terminal 200 is input to an adder 203. The input color image signal 202 is constituted by, e.g., R, G, and B signals (three primary color signals), and each of the R, G, and B signals has 8 bits. Note that the input color image signal 202 need not be constituted by the R, G, and B signals, and the input color image signal 202 may be constituted by, e.g., L*, a*, and b* signals.

An output signal from the adder 203 is input to a nonlinear quantization circuit 204. The nonlinear quantization circuit 204, as in the above embodiments, prevents a signal of a level easily set in an unstable recording state from being generated from the output of the nonlinear quantization circuit 204. At this time, combinations of colors which generate large snow noise caused by not only one ink but also combinations of inks are removed. In a color printer 205, combinations in which 4-bit tone control is performed for each color are used. Printing is performed by all color combinations, and a print sample is read by the color scanner 201 or a color sensor having characteristics equivalent to those of the color scanner 201. However, recording characteristics in a density level region having the unstable tone characteristics of one color contain large noise even when colors are stacked. For this reason, a print sample need not be formed from the beginning. In this manner, the number of operations is considerably reduced. In addition, when a print model is estimated, combinations of all colors need not be actually printed, a specific recording sample may be recorded, and other data may be estimated in accordance with the print model.

A signal required for recording of the print sample and a combination of the R, G, and B signals thereof are obtained. A color conversion table 206 is prepared on the basis of the signal and the combination. This color conversion table 206 may receive 4-bit data for each color and output 8-bit data for each color, and the color conversion table 206 can easily be prepared.

The nonlinear quantization circuit 204 is formed as a table such that combinations having unstable printing and large snow noise are removed from the color conversion table 206, and the content of the resultant table is reversed to the content of the color conversion table 206. The color printer 205 may be subjected to 4-bit control, and an input address of the nonlinear quantization circuit 204 may have 4 bits. In other words, the input address of the nonlinear quantization circuit 204 may have about 4 bits for each color, or 5 bits for each color in consideration of the nonlinearity of color conversion. In this manner, the capacity of a table (ROM) constituting the nonlinear quantization circuit 204 can be decreased.

An 8-bit output signal for each color output from the color conversion table 206 is input to a subtracter 207, and a difference between an 8-bit output signal and an output signal from the adder 203 is calculated. This difference is input to an error buffer 208, and a product of the difference and a weight coefficient matrix from a weight coefficient memory 209 is calculated by a multiplier 210 as in the first embodiment, and the product is input to the adder 203, thereby performing error diffusion.

In this embodiment, even in a recording system in which a noise level is considerably changed by stacking colors as in thermal transfer recording, when printing is performed while avoiding a density level which easily generates noise, recording can be performed with noise being suppressed. In addition, when correction is performed in consideration of the influence of adjacent pixels as in the second embodiment, more highly accurate color reproduction can be performed.

Figure 7:
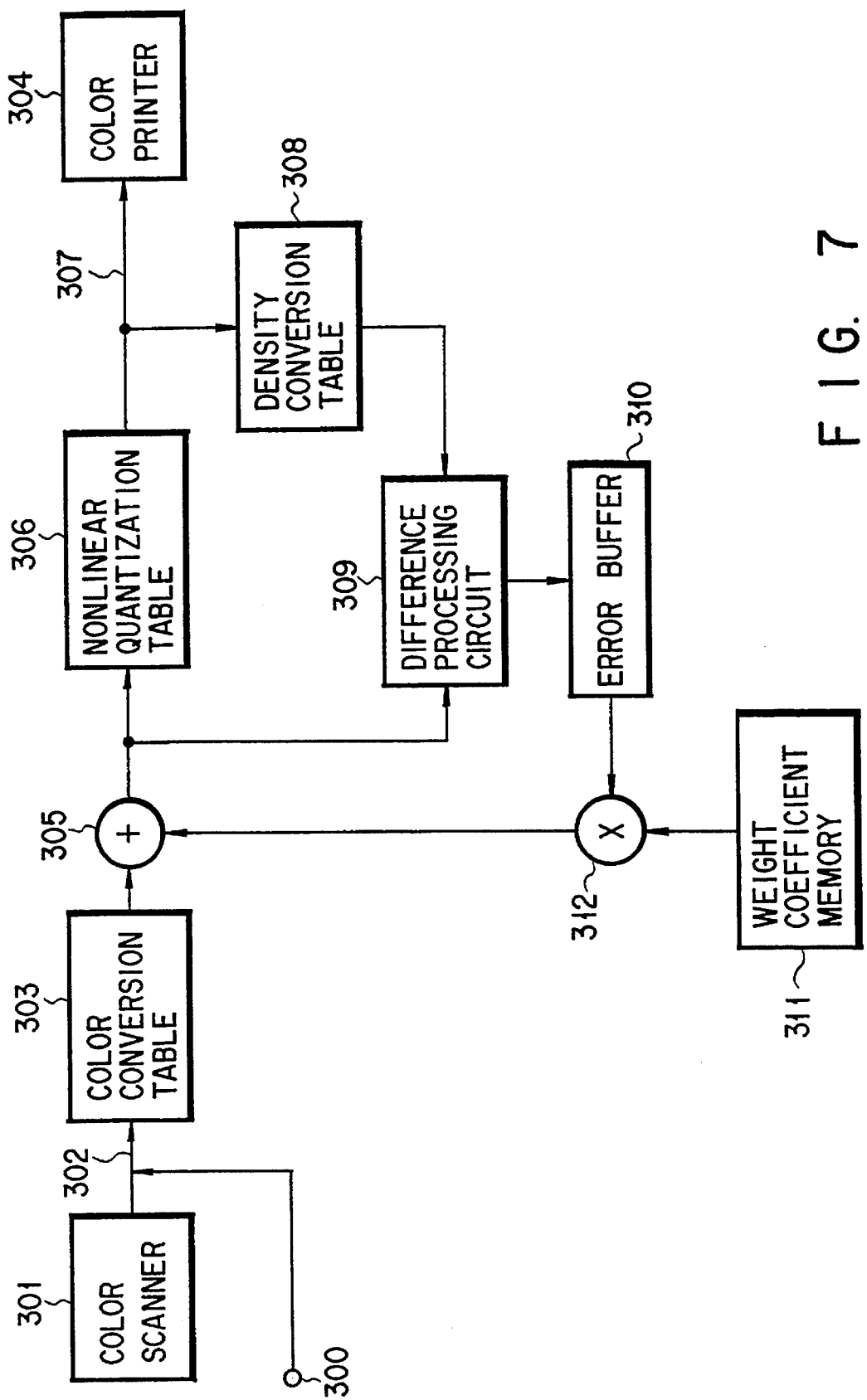
FIG. 7 is a block diagram showing an image recording apparatus according to a fourth embodiment of the present invention.

FIG. 7 is a view showing the fourth embodiment of the present invention. An input color image signal 302 input from a color scanner 301 or an input terminal 300 is constituted by R, G, and B signals generally serving as read color-separated signals, and the R, G, and B signals are converted into Y, M, C, and K (yellow, magenta, cyan, and black) signals serving as ink-color signals by a color conversion table 303.

If a method of stacking colors is determined, in general, the conversion from the R, G, and B signals to the Y, M, and C signals is determined. In contrast to this, a method of converting the R, G, and B signals into the Y, M, C, and K signals has a degree of freedom. A ratio (ratio of a black component constituted by Y, M, and C to a black component expressed by K) of the signal K, i.e., a black ink has a degree of freedom. The black component constituted by Y, M, and C cannot be simply replaced with the black K due to the influence of color stacking or a difference between the color tone of the black component (=min(Y, M, C)) constituted by Y, M, and C and the color tone of the black K. For this reason, the conversion of the R, G, and B signals into the Y, M, C, and K signals is complicated, and highly accurate color reproduction cannot be obtained.

According to this embodiment, as shown in a principle of FIG. 8, Y, M, and C ink signals are generated (step 21), and four Y, M, C, and K signals are generated in a predetermined algorithm (step 22). At this time, when color reproduction by the Y, M, and C ink signals is related to color reproduction determined by the four Y, M, C, and K signals generated in the predetermined algorithm, these colors need not be strictly equal to each other. In other words, a degree of freedom is allowed to some extent. For example, assume a method in which color inks (Y, M, and C) are rarely used in consideration of economy so as to extend the reproduction range of colors to obtain a high-quality image. In this case, the Y, M, and C signals are converted into the Y, M, C, and K signals so as to minimize amounts of inks (a total amount of Y, M, C, and K inks) to be used. More specifically, it becomes, for example, K=min(Y,M,C) signal. Recording signal processing (step 23) for actually performing recording in accordance with these signals, in this case error diffusion processing, is performed to record the signal in a printer (step 24). Recorded color patches are read, R, G, and B read signals are obtained by a color separation system. In order to obtain four color signals from the R, G, and B signals, a table is prepared by the obtained R, G, and B signals and the Y, M, C, and K signals. That is, a relationship indicated by the arrow in FIG. 8 is obtained. At this time, when a table is prepared by performing interpolation processing from a patch having a small number of colors, the number of operations may be decreased. In addition, the difference processing circuit 303 is constituted as shown in FIG. 9, and interpolation processing is performed by an interpolation processing circuit 33. When an output from the interpolation processing circuit 33 is synthesized with an output from an YMCK table 32 by an adder 34 to obtain Y, M, C, and K signals, smooth conversion can be performed even when the YMCK table 32 does not have a very large capacity.

A case wherein a color printer of a type in which a color printer 304 simultaneously outputs four colors, i.e., a color-sequential-output type color printer is used will be described below. In this case, the color conversion table 303 converts a color image signal into an ink color signal with reference to one color signal, of the Y, M, C, and K signals serving as ink signals, output from the color printer 304, and the color image signal is sequentially converted into the four ink color signals in correspondence with an output color of the color printer 304. The adder 305 adds correction signals to the ink color signals converted as described above. An output signal from the adder 305 is quantized into an unequal interval signal by a nonlinear quantization circuit 306.

In many types of laser printers or thermal transfer printers, recording can be performed at several levels or more by controlling a pulse width. However, it is difficult to control a large number of densities at equal intervals, and recording at a highlighted portion, i.e., a low-density level region, becomes easily unstable. In FIG. 10A, control amounts of a printer are plotted along the abscissa, and 1–R (R: reflectance) is plotted along the ordinate. In a density level region a of the highlighted portion, (1–R) is set to be 0 or b by a small change in atmosphere. The nonlinear quantization circuit 306 performs quantization without using recording levels in the low-density level region a. In other words, only recording levels at points indicated by ○ are used, and the nonlinear quantization circuit 306 is used as a table such that control signals at points indicated by × are not generated. In other words, the nonlinear quantization circuit 306 having input/output characteristics shown in FIG. 10B is formed as a table. A signal quantized at an unequal interval by the nonlinear quantization circuit 306 is used as an output signal 307, and the output signal 307 is supplied as a recording control signal to the color printer 304.

The signal quantized at an unequal interval by the nonlinear quantization circuit 306 is also input to a density conversion table 308, and the signal is converted by a density characteristic curve of the color printer 304 actually output as shown in FIGS. 10A and 10B, and a difference between the converted signal and a signal which is not quantized at an unequal interval is calculated by the difference processing circuit 309.

When an output signal from the nonlinear quantization circuit 306 is input to the density conversion table 308 and subjected to tone correction of the color printer 304, the signal quantized at a small number of multilevels by the nonlinear quantization circuit 306 is reproduced into a faithful tone by the control of a multilevel printer. Therefore, the tone reproduction can easily be realized because the multilevel control circuit in the printer 304 can be controlled by a small number of levels. For example, multilevel control is controlled by a pulse width, the multilevel control circuit need not be operated at a very high speed.

The error signal obtained by the difference processing circuit 309 is input to an error buffer 310. A product of an error signal from the error buffer 310 and a weight coefficient matrix from a weight coefficient memory 311 is calculated by a multiplier 312. As shown in FIG. 11, this calculation causes the error signal to be diffused to four points A, B, C, and D. Weight coefficients are A=$1/16$, B=$5/16$, C=$3/16$, and D=$7/16$. The diffused error signals are added to each other by the adder 305, and are entered in an error diffusion loop. When the error signals are entered in the error diffusion loop, the loop is operated such that an output whose density is converted, i.e., a density output from the color printer 304 coincides with an output signal from the color conversion table. Although a control signal level (indicated by × in FIG. 10A) at a point at which the color printer 304 unstably outputs a signal is not output from the nonlinear quantization circuit 306, an average density becomes equal to that of the color conversion table 303.

Even when tone characteristics are the nonlinear recording characteristics shown in FIG. 10A, an output having average tone characteristics is continuously obtained from the color printer 304.

AS described above, the color printer 304 can record one color at a time. For this reason, the color scanner 301 scans an original four times. The color printer 304 prints an yellow ink in the first scanning, and sequentially prints magenta and cyan inks, and finally a black ink. The scanner 301 and the color printer 304 perform scanning and printing in synchronization with each other. A positional error recorded by each ink occurs due to the elongation of paper or a limit of mechanical accuracy. In addition, the direction of the positional error is not constant, and the direction is changed every time a copying operation is performed, when the positions of colors are shifted as described above, a reproduced color is slightly changed.

In a conventional technique, a screen angle is used, and recording is performed while changing the screen angle of each color. In this manner, average shift between ink colors at a position on a paper surface is eliminated every time a copying operation is performed, thereby obtaining constant color reproduction. This technique is known well. However, when a screen angle is used, the resolution may be disadvantageously decreased, moire noise may be disadvantageously generated. The technique is not used in fields other than the field of printing capable of performing sufficient high-definition recording. In contrast to this, in this embodiment, error diffusion processing is independently performed for each color, and a signal itself varies at random. For this reason, a degree of random is not changed with a positional error of several pixels or less at any position on a paper surface every time a copying operation is performed, and color reproduction does not vary, thereby obtaining stable color reproduction.

According to this embodiment, faithful color reproduction corrected by the difference processing circuit 309 can be obtained. However, as shown in FIG. 10A, a tone degradation occurs at a highlighted portion, and texture noise can be slightly detected due to the tone degradation at the highlighted portion. In addition, snow noise is disadvantageously increased at the highlighted portion due to color stacking. When a color conversion table is prepared by a maximum blackening ratio, although an amount of ink to be used is advantageously minimized, a print signal is frequently used at the highlighted portion by the operation of undercolor removal. That is, when blackening is performed, the density of the color ink is decreased by an amount of ink used for the blackening. Therefore, an amount of color ink is originally small at a low-density portion. For this reason, when the color ink at a chromatic portion is replaced with a blackening ink, an amount of color ink is further decreased, and the density of the low-density portion is decreased. In this manner, when blackening is performed at the low-density portion, recording of a further unstable level is performed in the printer.

For this reason, recording is performed by only three color signals without performed blackening and undercolor removal at a low-density portion, and four-color printing is performed at a level at which a large amount of black ink is used. In this case, a print signal is not frequently used in an unstable portion. with the above arrangement, although an ink consumption amount is increased, the ink consumption amount is not actually increased because the amount of color ink replaced with a black ink is originally small at the low-density portion.

A method of forming a color conversion table for changing a blackening amount will be described below. FIG. 12 corresponds to the four-color signal generation processing 22 described in FIG. 8. A YMC ink signal 41 is obtained by the three-color signal generation processing 21 in FIG. 8, a blackening plate signal K is defined such that the minimum value of the Y', M', and C' inks constitutes a black ink plate, i.e., a blackening plate K'(42)=min(Y',M',C'). A blackening ratio P is controlled in accordance with a blackening plate signal K' as indicated by the broken line in FIG. 13, P=0 is kept until the blackening plate signal reaches a predetermined value a, and printing is performed by only three color inks. The blackening ratio P is increased at a constant rate until the blackening plate signal reaches a point b to gradually increase four-color printing. P=100% is kept when the blackening plate signal reaches the point b. In this manner, the blackening ratio P (43) is determined, a product of the blackening plate signal K' and the blackening ratio P is calculated by a multiplier 44, and the product is defined as the blackening plate signal K which is to be actually used. A difference between the blackening plate signal K and the YMC ink signal 41 subjected to undercolor removal is calculated by a subtracter 45, and the YMC ink signal 41 is converted into Y', −K, M', −K, C', and −K signals. As described above, the YMC ink signal 41 is converted into a four-color signal 46.

Figure 13:
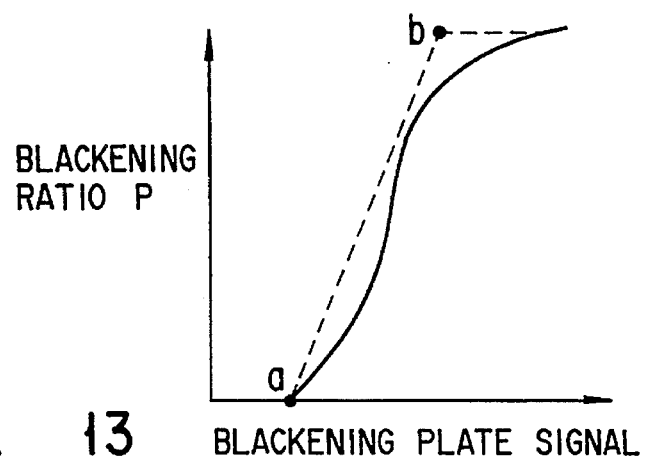
FIG. 13 is a graph showing a control curve obtained when a blackening ratio P is variable in undercolor removal and blackening.

In this case, although color reproduction by the three-color signal may be different from that by the four-color signal due to the nature of inks, when a reverse table is prepared as shown in FIG. 8, faithful color reproduction can be obtained. In addition, if a curve indicated by the solid line in FIG. 13 is used as a curve of switching three-color printing to four-color printing, the three-color printing can be more smoothly switched to the four-color printing. Therefore, the three-color printing can be performed in using a small blackening plate, and a blackening ratio can be set to be 100% in using a large blackening plate.

When inks are stacked at random, and a method of only removing the blackening plate K from a chromatic portion of Y, M, and C inks is performed as undercolor removal processing, a color tone is degraded in a high-density portion. When a color correction table is prepared by a reverse table scheme described in FIG. 8, color reproduction can be assured. However, in order to form a table for assuring color reproduction at a low-illuminance portion to some extent, the table must be prepared such that a large number of color patches must be formed in a large number of density levels and are loaded. In this case, the number of operations is increased. Therefore, when the following method is used, the table can be prepared without loading a large number of color patches.

This equivalently corresponds to that degradation of a color tone is suppressed by blackening. As a method of suppressing degradation of a color tone, a GCR (Gray Component Replacement) method is known. According to the GCR method, assume that a chromatic signal in actual 4-color printing and a chromatic signal in actual 3-color printing are represented by I and I', respectively, and printing is performed such that the signal I satisfies a relationship of (I'−K)/(1−K). That is, when the blackening plate signal K is close to 1, the chromatic signal is close to 1. At this time, when the color balance of Y, M, and C is slightly degraded, the colors are considerably shifted, and a proper color conversion table cannot easily be prepared. In order to correct this, undercolor removal is preferably performed by equation (3).

$$I=(1+K)(I'-K) \qquad (3)$$

Figure 14A:
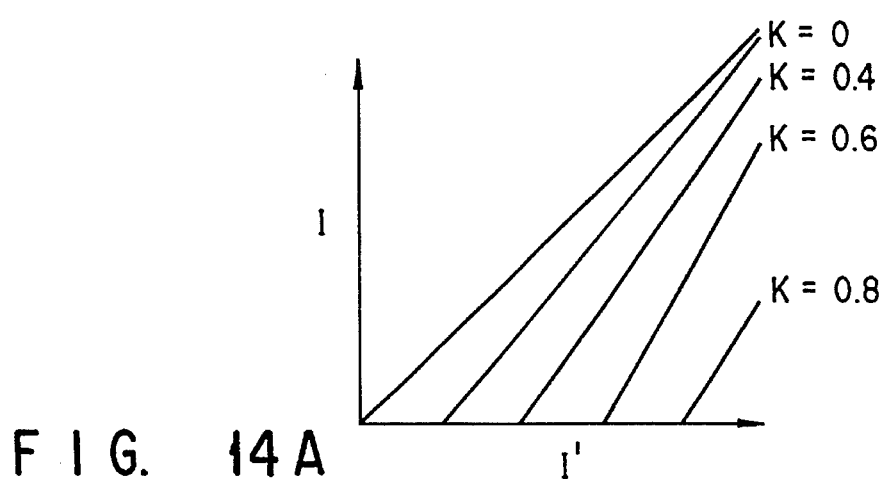
FIGS. 14A and 14B are graphs showing relationships between an input and an output before and after correction in an under color removal method according to the present invention.

FIG. 14A is a graph showing a relationship between a signal I' before the undercolor removal and a signal I after the undercolor removal by using the blackening plate signal K as a parameter. According to FIG. 14A, although degradation of a color tone is corrected in setting the blackening plate signal K at low level, a function of correcting the degradation of the color tone is weakened in setting the blackening plate signal K at high level. Even when K=1, a change rate of the signal I after the undercolor removal is performed is 2, and the signal I is stable against a variation in color balance. Degradation of a color tone and stability of a color balance cannot be adjusted in equation (3), but can be adjusted in equation (4).

$$a = (p - n)K + n \qquad (4)$$
$$I = a(I' - K) + (1 - a)(I' - K)/(1 - K)$$

Figure 14B:
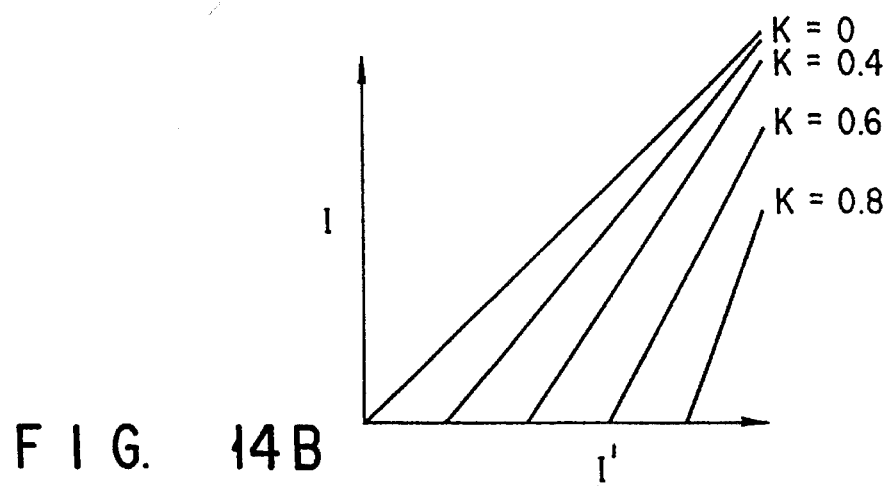

When n is decreased in equation (4), degradation of the color tone of a low-density color can be prevented. When p is decreased, degradation of the color tone of a high-density color can be prevented, but stability is easily degraded by a variation in color balance. For example, when n=0.03 and P=0.9, a preferable result shown in FIG. 14B is obtained. According to equations (3) and (4), the degradation of a color tone can be prevented, and stability against a variation in color balance can be improved.

As described above, according to the fourth embodiment of the present invention, a YMCK four-color signal is generated from a RGB three-color signal by using a color conversion table or the like, and halftone processing is independently performed for each color by a multilevel error diffusion method. At this time, uniform and stable color reproduction free from texture noise can be obtained. In addition, when nonlinear quantization or blackening ratio variation recording is combined to the error diffusion method, even when unstable recording is performed, preferable color reproduction free from a pseudo contour can be obtained. When the functions of undercolor removal are preferably changed, degradation of a color tone can be advantageously prevented, and stable color reproduction at a high-density portion can be advantageously obtained.

In the fourth embodiment shown in FIG. 7, error processing is performed by the difference processing circuit 309 on the basis of data obtained by density-converting the output signal 307 from the nonlinear quantization circuit 306 by a tone correction table 313 in accordance with the color printer 304.

Figure 15:
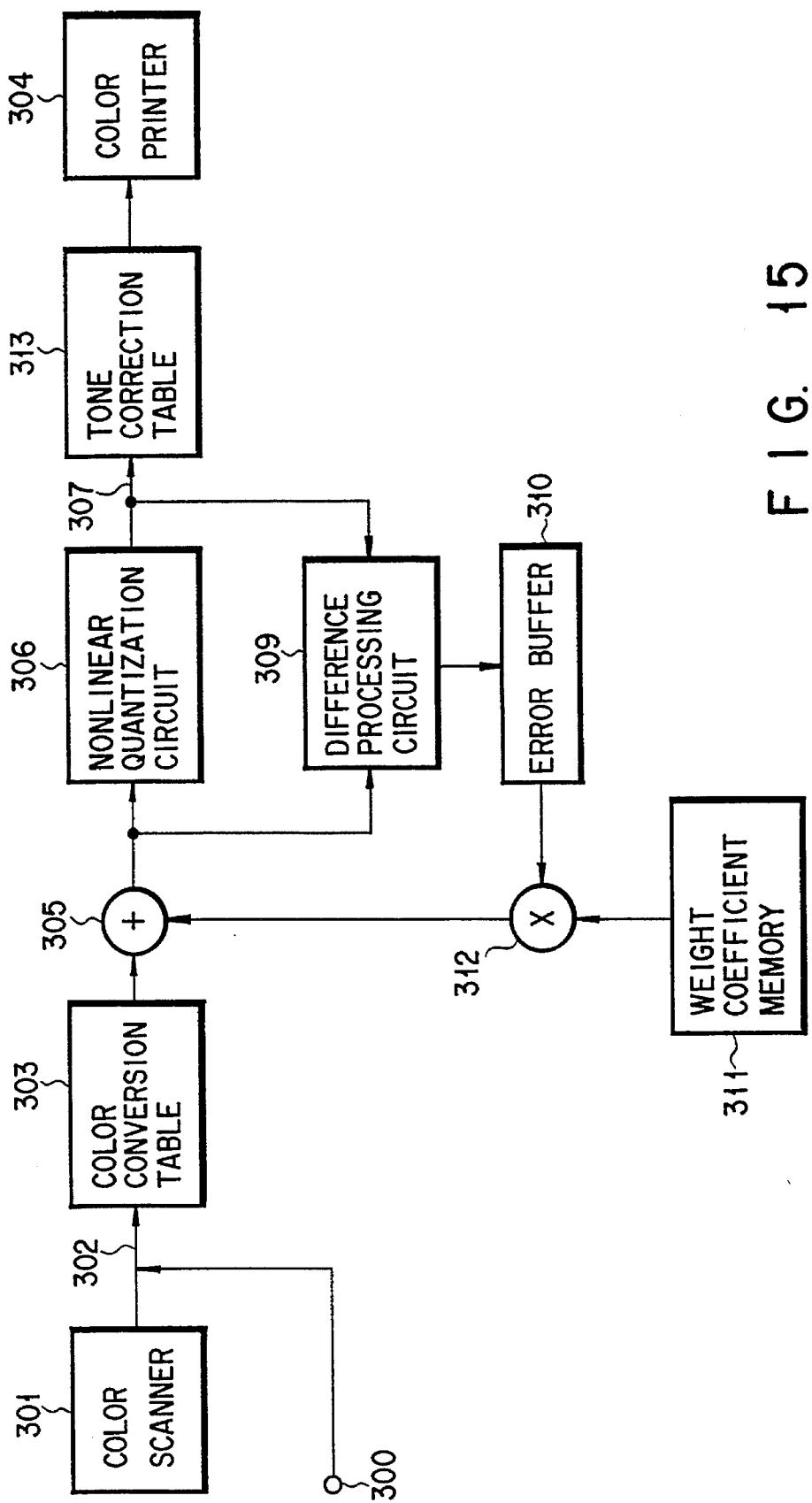
FIG. 15 is a block diagram showing an image recording apparatus according to a fifth embodiment of the present invention.

In the fifth embodiment, as shown in FIG. 15, an difference processing circuit 309 uses an output signal 307 from a nonlinear quantization circuit 306. In this case, when a color printer 304 has nonlinear tone characteristics, color reproduction is shifted. For this reason, according to this embodiment, a tone correction table 313 for causing a density given by the output signal 307 from the nonlinear quantization circuit 306 to coincide with the density of the color printer 304 is provided. In this manner, preferable color reproduction can be obtained.

The versatility of this embodiment is improved because the output signal 307 from the nonlinear quantization circuit 306 includes tone characteristics inherent to the color printer 304. However, in order to effectively use the ability of the color printer 304, the number of multilevel control values of the color printer 304 must be increased.

According to the fourth and fifth embodiments, in order to obtain faithful color reproduction, a large-capacity memory (ROM) must be used in a color conversion table 303. In order to cope with this, when the interpolation processing circuit 33 is used as shown in FIG. 9, an increase in capacity of the color conversion table 303 can be prevented. However, a method of forming the color conversion table 303 must be modified for better effects. In addition, the interpolation processing circuit 33 inevitably has a large circuit scale.

In order to solve the above drawback, according to the sixth embodiment, as shown in FIG. 16, a nonlinear quantization table 402 is combined to a color conversion table 404, and the number of quantization levels of the color conversion table 404 is reduced to the number of quantization levels of a color printer 403. In FIG. 16, a printer of a type of simultaneously receiving four colors (Y, M, C, and K), e.g., an ink-jet printer, or an electrostatic recording (electrophotographic scheme) printer using a four-drum scheme is used as the color printer 403. At this time, the printer for simultaneously recording colors is not used, but a printer for sequentially recording colors may be used as in the previous embodiments. In this case, a color scanner and a printer are interlocked to each other every time printing for each color is performed, and an ink signal simultaneously performs calculations of four colors. An ink amount is calculated four times, and the ink signal is preferably switched to be supplied to the printer.

An RGB signal serving as an input image signal 302 input from a color scanner 301 or an input terminal 300 is input to an adder 401. The adder 401, as in the above embodiments, adds errors having being output to the RGB signal to diffuse the errors. An output signal from the adder 401 is quantized at an unequal interval by the nonlinear quantization table 402 having a color conversion function. The number of input addresses of the nonlinear quantization table 402 is almost equal to the tone quantization number of the color printer 403, or is slightly larger than the tone quantization number. In this case, in consideration of nonlinearity in color conversion, the nonlinear quantization table 402 is prepared such that the number of input address bits is set to be 5 for each of R, G and B colors because the color printer 403 has 16 tones for each color and four bits for each color. In addition, according to this embodiment, an 8-bit RGB signal is converted into a 5-bit RGB signal by only inputting the upper five bits to the nonlinear quantization table 402. Note that the nonlinear quantization table may be used to convert the 8-bit signal to the 5-bit signal as needed. The number of output bits of the nonlinear quantization table 402 is four for each of Y, M, C, and K colors.

An output signal from the nonlinear quantization table 402 is converted into an RBG signal by the color conversion table 404. The color conversion table 404 is obtained by measuring color patches printed by 4-bit data of each color by an RGB sensor. At this time, as in the previous embodiment, the color patches are formed by a color signal subjected to undercolor removal processing by equations (3) and (4). In this manner, a decrease in ink amount to be used and prevention of degradation of a color tone caused by the positional error of the printer can be achieved. In addition, as shown in FIG. 13, color reproduction can be stabilized by using a variable blackening ratio P as in the previous embodiments. When a print model of the color printer 403 is estimated to some extent even when color patches are not actually formed, it is more effective that the color conversion table 404 is formed by the estimated value.

The nonlinear quantization table 402 is used as a reverse conversion table of the color conversion table 404. At this time, the signal of a color patch which causes unstable recording characteristics, more specifically, a color patch having a large amount of snow noise, or the signal of a color patch rarely recorded is preferably removed as in the previous embodiments so as not to be accessed. In this manner, stable recording having reduced snow noise can be performed.

In this embodiment, as a color which causes unstable recording need not be used in printing depending on combinations of colors, not only unstable recording caused by nonlinearity of one color can be removed, but also the signal of a color patch causing unstable recording in which unstable recording is performed by stacking colors can be removed. However, a color removed from the nonlinear quantization table 402 is not perfectly reproduced (the color is not expressed in one pixel). The color is averagely reproduced on the basis of the principle of error diffusion recording, and faithful color reproduction can be obtained with snow noise being reduced.

An error between an output signal which is output from the color conversion table 404 and obtained by estimating an actual signal used in the above printing and an output signal output from the adder 401 and serving as a target value to be printed is calculated and input to an error buffer 406. A product of the error and a weight coefficient matrix from the weight coefficient memory 408 is calculated by the multiplier 407 and input to the adder 401, thereby feeding back a color shift. Although the same weight coefficient matrix is used for each color, different weight coefficient matrices may be used for colors.

As described above, according to this embodiment, a high-quality image can be obtained by using a small-capacity table (the nonlinear quantization table 402) for converting an RGB signal to an YMCK signal. According to this scheme, however, the error buffer 406 or the like requires three channels, and weight coefficients must be calculated at a high speed.

According to this embodiment, although a signal other than the output signal from the nonlinear quantization table 402 is used as an RGB signal, the signal need not be used as the RGB signal, but is used as an YMC signal or an L*a*b* signal. More specifically, when the color printer 403 is used, the YMC signal or the L*a*b* signals is effectively used. When the input color image signal 302 is used as an YMC signal, the number of bits of data input to the nonlinear quantization table 402 may be almost equal to the number of quantization levels of the color printer 403.

When the input color image signal 302 is used as the L*a*b* signal, it is more effective that weight coefficients multiplied with the output signal from the error buffer 406 are different from each other with respect to the L*a*b* signals. For example, the L* signal can use the weight coefficients shown in FIG. 11 as in the previous embodiments. However, the a* and b* signals may have weight coefficients, e.g., A=0, B=0, C=0, D=1. In this manner, the circuits of the error buffer 406 and the multiplier 407 are simplified.

Figure 17:
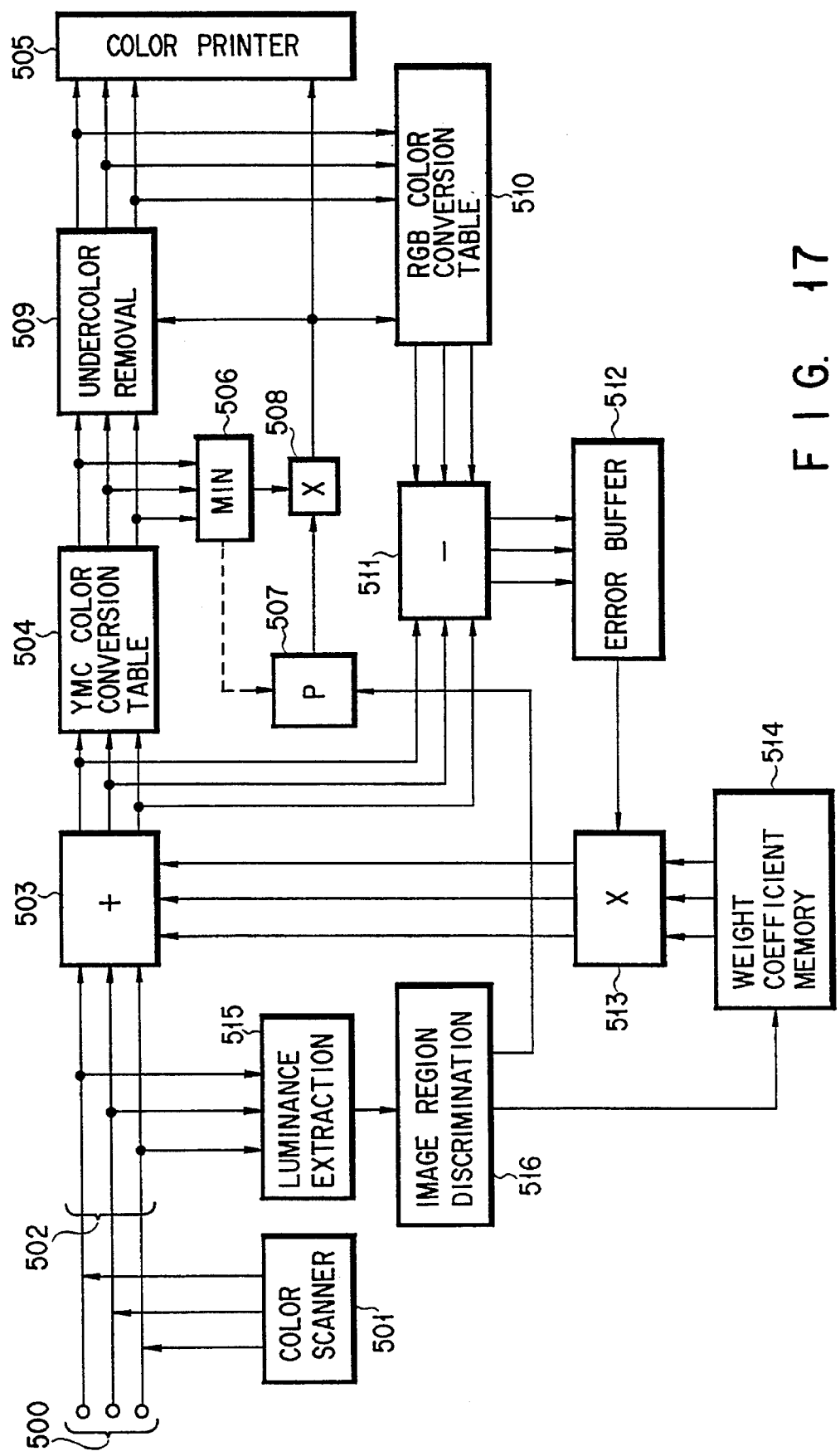
FIG. 17 is a block diagram showing an image recording apparatus according to a seventh embodiment of the present invention.

FIG. 17 is a view showing the seventh embodiment of the present invention. An RGB signal serving as an input image signal 502 input from a color scanner 501 or an input terminal 500 is input to an adder 503. The adder 503 adds errors having being output to each other to diffuse an error between a target value to be output and an output signal.

An output signal from the adder 503 is converted into an YMC ink amount signal by an YMC color conversion table 504. A color printer 505 is a multilevel color printer capable of expressing, e.g., 16 tones. For this reason, the converted ink amount signal is quantized in 16 levels to be input to the color printer 505. The number of address bits of data input to the YMC color conversion table 504 may be equal to or slightly larger than the number tone quantization levels of the color printer 505. In this case, the table is prepared such that the number of address bits of data input to the YMC color conversion table 504 is set to be 5 for each of R, G, and B colors because data output from the color printer 505 has 16 tones and 4 bits for each color. The number of bits of data output from the YMC color conversion table 504 is set to be 4 for each color.

A blackening plate signal K' which is not corrected is generated from the output of the YMC color conversion table 504. The blackening plate signal K' has a minimum value of three Y, M, and C colors, i.e., K'=min(Y',M',C'), and is calculated by a minimum value circuit (MIN) 506. A blackening ratio P is determined in accordance with table (P) 507, a product of the blackening plate signal K' and the blackening ratio P is calculated by a multiplier 508, and the product is defined as an actual blackening plate signal K.

As shown in FIG. 18, the blackening ratio P can be changed by a blackening plate signal which is not corrected. In other words, in a curve a, the blackening ratio P is set to be 0 (corresponding to three-color printing) when K' is small, and the blackening ratio P is set to be 1 (corresponding 100% undercolor removal) when K' is increased. On the other hand, in a curve c, the blackening ratio P is set to be 1 (corresponding 100% undercolor removal). A curve b is located between the curve a and the curve b.

The table 507 is constituted by a ROM which stores data of the curves a, b, and c in advance, and data of any one of the curves is selected in accordance with a result of image region identification (to be described later). In other words, the curve c is selected when data reliably represents a character region, and the curve a is selected when the data represents an halftone image region. In addition, a curve b is selected when the data is seemed to represent the character region. In this manner, the blackening plate signal K to be actually printed is determined. Note that the multiplier 508 may be constituted by a small-capacity ROM because the multiplier 508 may output 4-bit data.

The blackening plate signal K is input to an undercolor removal circuit 509 and is subtracted from each of the output signals (Y', M', and C') from the YMC color conversion table 504. In other words, actual print signals are represented by Y, M, and C, and these signals satisfy conditions of Y=Y'–K, M=M'–K, and C=C'–K. The signals Y, M, C, and K are input to the color printer 505.

The signals Y, M, C, K are also input to an RGB conversion table 510. The RGB conversion table 510 converts the signals Y, M, C, and K into R, G, and B signals obtained when the signals Y, M, C, and K are actually printed by the color printer 505 and read by the color scanner 501. Therefore, the RGB conversion table 510 can be realized by a ROM in which print data obtained by actual printing is used as an address and the R, G, and B signals read by the color scanner 501 from the printed output are present. The address of data input to the RGB conversion table 510 has four bits for each of Y, M, C, and K, thereby obtaining total 16 bits. 8-bit data for each of R, G, and B is output from the RGB conversion table 510.

An error between the signal converted by the RGB conversion table 510 and an output signal from the adder 503 is calculated by a subtracter 511, and the error is input to an error buffer 512. The content of the error buffer 512 is input to the multiplier 513, and a product of the content of the error buffer 512 and the content of a weight coefficient memory 514 for error diffusion is calculated to be fed back to the adder 503, and the resultant value is input to the input image signal 502 as a correction value of the error.

Weight coefficients of error diffusion are diffused to four points A, B, C, and D shown in FIG. 19 when an image is discriminated as a halftone image by image area discrimination. A mark × in FIG. 19 represents the position of a dot to be printed. At this time, the coefficients A, B, C, and D are set to be $1/16$, $5/16$, $3/16$, and $7/16$. In this case, errors are independently diffused with respect to R, G, and B color components. An error Em–k,n–p having independently occurred for each color component ahead of an input signal fmn by a pixel (k,p) is weighted with a coefficient αkl of the weight coefficient memory 514, and the weighted error is added to input image signal fmn. The resultant value is defined as a correction value f'mn of the next pixel, and the correction value f'mn is quantized at an unequal interval by the nonlinear quantization circuit 104. At this time, the correction value f'mn is expressed by equation (1).

As expressed by equation (2), the error Em–k is represented by a difference between the correction value f'mn and a signal of a color component developed by the color printer 505, i.e., an output signal Gmn from the RGB conversion table 510.

With the above arrangement, the blackening ratio P is changed depending on the value of the blackening amount K' or a result of image region discrimination. Even when the effective blackening amount K and an undercolor removal ratio or an YMC ink amount are changed, stable color reproduction can be obtained because the difference between the correction value and the output signal Gmn from the RGB conversion table 510 is added to the input image signal fmn to be diffused.

When an image is discriminated as a character image by image region discrimination, all the coefficients A, B, C, and D are set to be 0, errors are not diffused, and the resolution is preferentially increased. When an image is discriminated as an image which does not reliably represent a character region, but the image is discriminated as an image which is in a region where an edge is preferably emphasized, only the coefficient D is set to be 1, and the remaining coefficients A, B, and C are set to be 0 to narrow a diffusion region, thereby preventing image blurring.

Image region discrimination will be described below. The input image signal 502 is input to a luminance extraction circuit 515. In the luminance extraction circuit 515, a luminance is calculated by (R+G+B)/3, and the resultant value is input to the image region discrimination circuit 516. The details of the image region discrimination circuit 516 are shown in FIG. 20.

Figure 20:
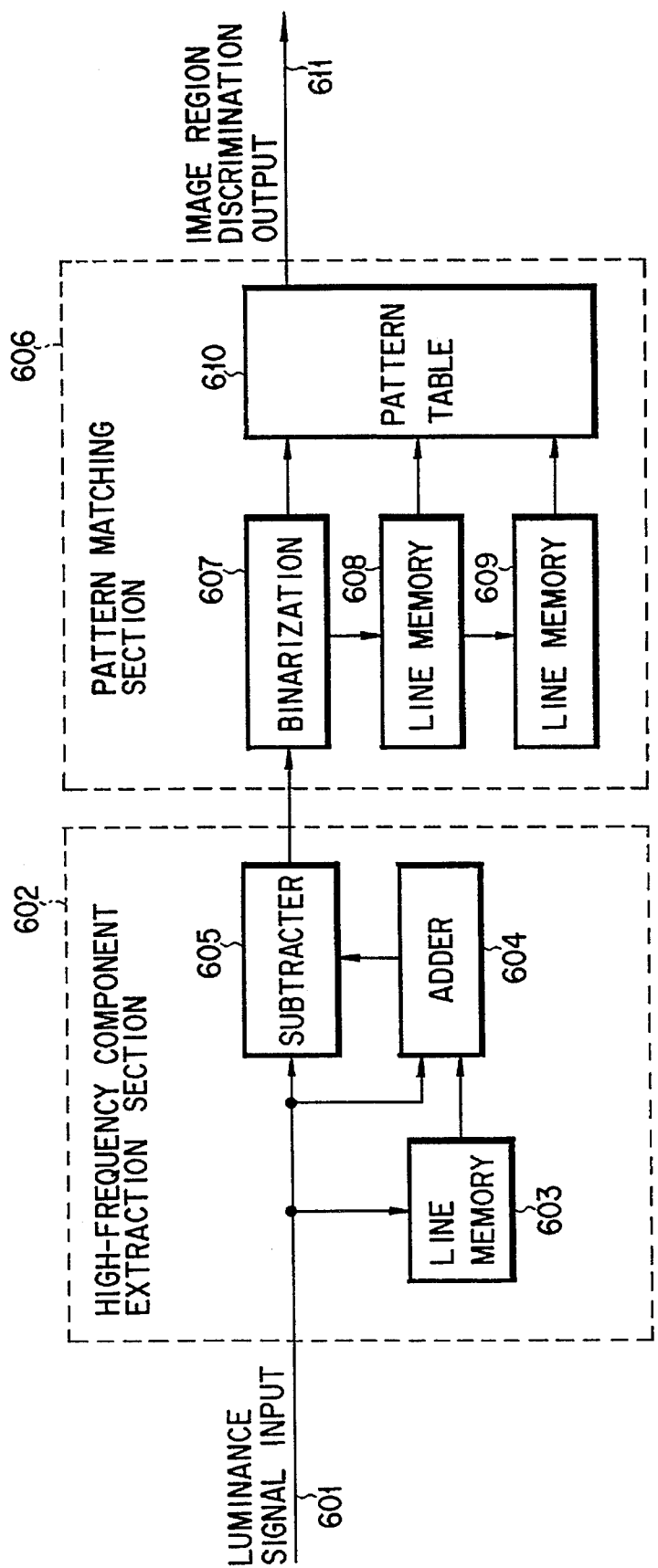
FIG. 20 is a detailed block diagram showing an image region descrimination circuit.

In FIG. 20, a luminance signal 601 is input to a high-frequency component extraction unit 602 to extract a high-frequency component. In other words, a luminance signal obtained by causing the luminance signal 601 to pass through a line memory 603 is added to the luminance signal 601 by the adder 604, thereby extracting the low-frequency component of the luminance signal 601. A difference between the low-frequency component and the luminance signal 601 is calculated by the subtracter 605 so as to extract the high-frequency component of the luminance signal 601. The high-frequency component is input to the pattern matching unit 606, and binarized by a binary coding circuit 607, and sequentially input to line memories 608 and 609. Three pixels are read out at a time from the binary coding circuit 607 and the line memories 608 and 609, and the pixels are input, as a 3×3 pixel pattern, to a pattern table 610 (9-bit input address) constituted by a ROM.

The pattern table 610 classifies the 3×3 pixel patterns of the high-frequency components of test images such as a halftone image and a character image including a dot image in advance. The 3×3 pixel patterns are classified into three patterns, i.e., a pattern of a character image region, a pattern of a halftone image, and a pattern which is located near a character and the edge of which is to be emphasized, and the these patterns are stored.

FIGS. 21A to 21C illustrate some of the above patterns. FIG. 21A shows the pattern of a character portion, FIG. 21B shows a pattern which is not defined as a character and a line but is to be subjected to edge emphasis, and FIG. 21C shows a pattern of a halftone image including a dot image or the like, a halftone image of which is to be reproduced at a high accuracy. The pattern table 610 causes these patterns to correspond to memory addresses, respectively, and the pattern table 610 may be constituted by a ROM using an output (in this case, a two-bit output is used because the patterns are classified into three types) from the pattern table 610 as a content. In this manner, an image region discrimination signal 611 is obtained from the luminance signal 601. The details of the discrimination method is described in Published Unexamined Japanese Patent Application No. 60-204177.

As described above, the blackening ratio P is switched in accordance with the image region discrimination signal 611 obtained as described above. In this case, the blackening ratio is set to be high (P=1) in a character portion, and the blackening ratio P at a low-density portion is set to be low in a halftone image portion by changing the blackening amount K', thereby reducing snow noise of an image caused by blackening. Even when blackening of 100% is performed in a portion having a large blackening amount, the image rarely becomes coarse. For this reason, sufficient undercolor removal is performed by setting the blackening ratio P to be 1.

When the extent of error diffusion is changed by the image region discrimination signal 611, image blurring caused by the error diffusion can be prevented. In other words, error diffusion is not performed in a character portion, and the resolution is preferentially set. In halftone images, errors are diffused to four pixels. In the halftone images, errors are transmitted to only an adjacent pixel to prevent image blurring.

In this manner, a sharp image free from color blurring can be obtained in a character portion, and smooth color reproduction can be obtained in a halftone image portion. In addition, sufficient undercolor removal is performed in a portion having a large blackening amount. For this reason, an amount of effectively used ink is almost equal to that obtained when 100% blackening is performed to all images, and an ink consumption amount is reduced by 50% compared with 3-color printing, thereby performing economical recording.

The eighth embodiment in which an under color removal method is switched by an image area discrimination signal to obtain a high-quality image will be described below. The arrangement of the eighth embodiment is the same as that of the seventh embodiment except that the under color removal method is switched to obtain a high-quality image. In the seventh embodiment, the undercolor removal processing is performed such that an effective blackening signal K is subtracted from an original ink amount signal. In this processing, a problem is not posed in a character image. However, in the halftone image, a color tone is degraded by stacking blackening plates because color inks are stacked at random. In this case, according to the seventh embodiment, although the error is corrected by a loop of error diffusion, noise is diffused by the error, and the error influences degradation of resolution and an increase in noise.

As described above, when the color inks are stacked at random, and a blackening plate K is only removed from a chromatic ink as undercolor removal processing, degradation of a color tone at a high density is increased. As a method of suppressing the degradation of a color tone, the GCR method is known as described above. In addition, as a method of solving the drawback of the GCR method, when equations (3) and (4) are used, prevention of degradation of a color tone, stability against a variation in color balance, high-quality images of a black character and the like can be obtained.

Referring to FIG. 22, the above undercolor removal processing is constituted as an undercolor removal processing table 701, ink amount signals Y', M', and C' before correction are set as inputs 702, 703, and 704 of the undercolor removal processing table 701. In addition, the blackening plate signal K is set as an input 705, and an image region discrimination signal is set as an input 706. When a character image is used, these signals are converted into signals except for the blackening plate signal K. When an image other than the character image is used, a table for undercolor removal processing expressed by equations (3) and (4) is selected, and conversion is performed. When the undercolor removal processing is performed as described above, a sharp character image which is rarely blurred can be reproduced, and a halftone portion is rarely darkened, thereby obtaining a high-quality image.

The ninth embodiment in which a blackening plate generation signal is switched by an image discrimination signal will be described below with reference to FIG. 23. In the seventh embodiment, as shown in FIG. 17, a minimum value of YMC serving as a blackening plate signal K' is obtained by the minimum value circuit 506. When the blackening signal K' is determined as in the seventh embodiment, an excessive blackening signal is present in a portion corresponding to the chromatic portion of a natural image, and the chromatic portion may be darkened. In this case, when a blackening plate signal K' is not determined by the minimum value of YMC, but is determined by a product of ratios of Y, M, and C areas, the chromatic portion is rarely darkened. However, in this case, a blackening amount is decreased in a character portion or the like, character image quality is degraded. For this reason, it is effective that a blackening plate generation scheme is switched by an image region discrimination signal as in this embodiment.

FIG. 23 is a block diagram showing a blackening plate generation system in this embodiment. In a character region, a blackening plate generation circuit 801 outputs a minimum value of Y, M, and C inks in response to an image region discrimination signal 802 as in the seventh embodiment. In a halftone region, a product 803 of Y, M, and C ink amounts is output. As a detailed arrangement of the blackening plate generation circuit 801, values which are calculated in advance may be stored as a ROM table. Other arrangements are the same as those of each of the previous embodiments. In this manner, a solid black character can be reproduced in a character portion, and a halftone portion is not darkened, thereby obtaining natural color reproduction.

Figure 24:
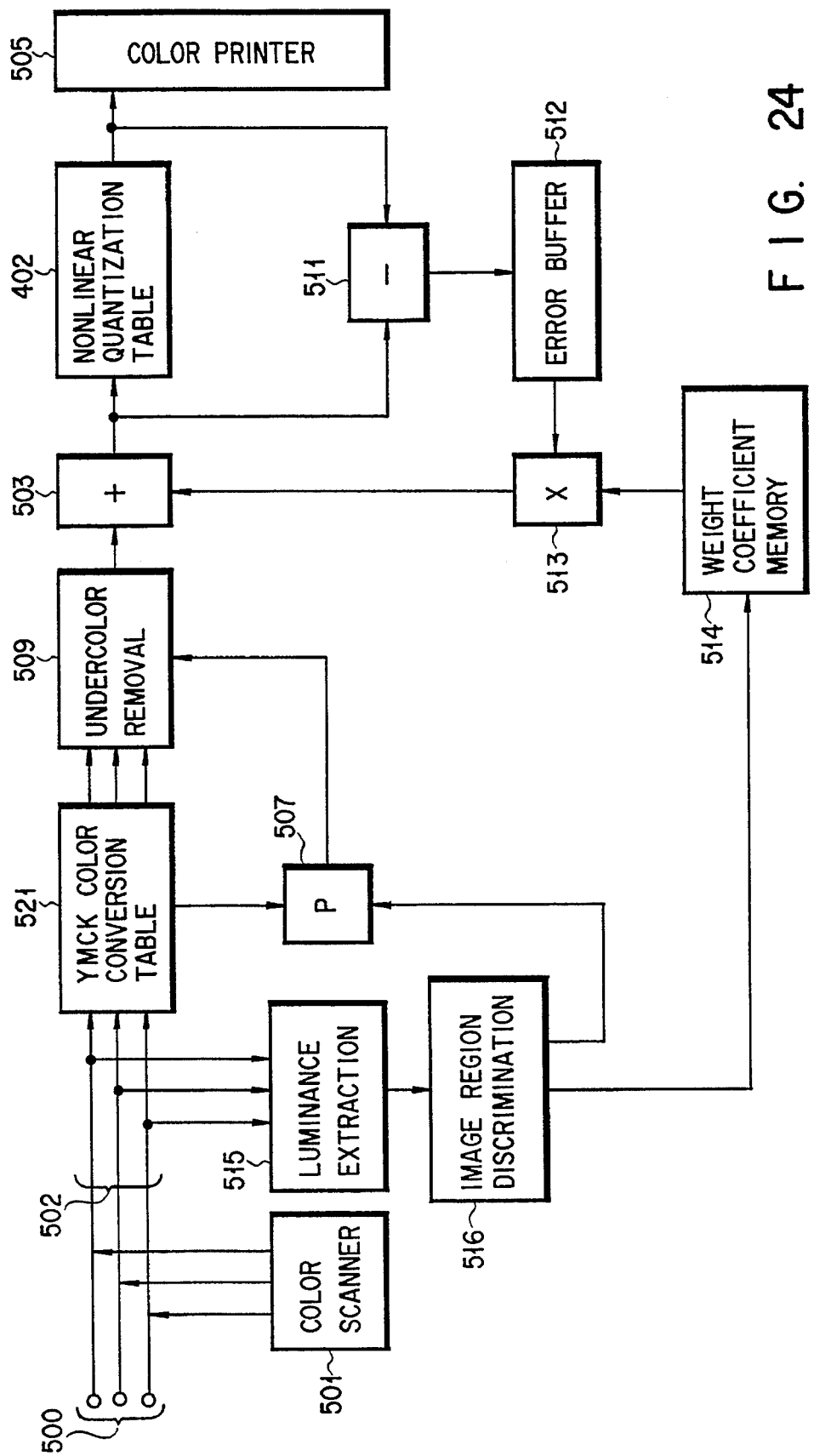
FIG. 24 is a block diagram showing an image recording apparatus according to a tenth embodiment of the present invention.

The tenth embodiment in which non-color information is subjected to error diffusion recording after YMCK color conversion is performed will be described below with reference to FIG. 24. In FIG. 24, an input image signal 502 is input to a YMCK conversion table 521, and converted into an ink amount signal. This ink amount signal has not yet been subjected to undercolor removal. As in the seventh embodiment, a blackening ratio (P) 507 is determined by an image region discrimination signal and a blackening amount K' from the non-corrected YMCK color conversion table 521 so as to calculate an effective blackening amount K, and an ink amount signal is processed by an undercolor removal circuit 509 on the basis of the effective blackening amount K.

Printed color signals of an output from the undercolor removal circuit 509 are input to a next adder 503 in correspondence with a color printer 505 (color printer in which Y, M, C, and K are sequentially printed in an image screen) in which a plurality of colors are not simultaneously recorded. An output signal from the adder 503 is input to a nonlinear quantization table 402, and is quantized at an unequal interval in accordance dance with the multilevel of the adder 503. Subsequently, as in the seventh embodiment, the signal is subjected to error diffusion recording processing. However, unlike the seventh embodiment, an error is calculated in one channel. For this reason, the circuits of an error buffer 512, a multiplier 513, and a weight coefficient memory 514 are simplified. However, in order to realize high-quality color reproduction, the YMCK conversion table 521 requires a large-capacity memory. Therefore, as described in FIG. 9, interpolation processing of the table is preferably performed.

In the seventh embodiment, weight coefficients of R, G, and B are commonly switched in response to a discrimination signal. In the tenth embodiment, the weight coefficients used in the previous embodiments are used in printing of Y, M, and C ink colors. However, only when a blackening plate is printed, unlike the weight coefficients of the printing of the Y, M, and C color inks, all the matrix coefficients A, B, C, and D are set to be 0 in a character region to eliminate error diffusion so as to obtain high-definition image because resolution is most important. In other regions, only the coefficient D is set to be 1 to decrease an error diffusion area, thereby preferentially setting the resolution. In this operation, the quality of a black character is improved.

In addition, as a modification of the tenth embodiment, although not shown, the nonlinear quantization table 402 is controlled in response to an output signal from an image region discrimination circuit 516, binary quantization or quantization of several levels is performed in a character region, and quantization of four or more levels is performed in a halftone region, thereby outputting a signal form the nonlinear quantization table 402. In this manner, image quality is effectively improved in a high-definition printer in which unstable recording is easily performed (phenomenon such as an increase in snow noise occurs) when the number of levels is increased.

The eleventh embodiment on the basis of a multilevel texture dither method will be described below with reference to FIG. 25. According to this embodiment, an image signal from an input terminal 100 or a scanner 101 is input to a nonlinear multilevel dither table 901. In the nonlinear multilevel dither table 901, its content is changed in accordance with X and Y on an image by an address circuit 902 to generate a multilevel dither output. This multilevel dither output is input to a printer 106, and is reproduced as an image. In FIG. 26, a mark ○ shows a recording multilevel of the printer 106 in this case. In FIG. 26, unstable recording characteristics in the first-level tone are shown. Recording at second, third, and fourth levels has stable recording characteristics. Accordingly, in order to perform a stable recording, the dither circuit does not use the first level, but second, third and fourth levels. In other words, the tone shown by marks ○, white recording, and solid black recording are used. A tone is expressed in 8 levels (9 levels including a density of 0).

FIG. 27 shows a multilevel dither output at this time. FIG. 28 shows the detailed content of nonlinear multilevel dither table 901 capable of outputting the multilevel dither output in FIG. 27. As shown in FIG. 28, 0-level to solid, i.e., 8-level image signals are input to the table 901. The XY address circuit 902, recognizes whether the image signal represents odd-numbered (2n–1) or even-numbered (2n) image data and odd-numbered (2m–1) or even-numbered (2m) image data because the dither matrix is set to be a 2×2 matrix by a current recording position. In other words, the nonlinear dither table 901 is accessed by the image signal and an address determined by a position to be recorded, and a content corresponding to the address is output. For example, when an input image signal can be set at three levels, the position of an image is an odd-numbered image and is in an even-numbered line, a signal at level 2 is output. The tone characteristics of the image output as described above exhibit a tone increasing every two levels. Therefore, the tones indicated by Δ and ○ in FIG. 26 can be expressed as recording outputs.

According to the first aspect of the present invention, multilevel diffusion recording is performed without using unstable recording levels of a recording apparatus, thereby performing stable recording. A tone recording level corresponding to an unstable recording level is expressed by a set of dots of stable tone levels, a large error is not generated unlike binary error diffusion recording, and the contrast of texture noise is kept low, thereby obtaining a high-quality image free from snow noise. In addition, stability of a recording system can be equivalently improved, the linearity of an input image signal can be improved, and a dynamic range can be widened. For this reason, even when a variation in input image signal or a variation in output recording system occurs, stable recording can be performed.

According to the second aspect of the present invention, undercolor removal of an input color image signal is performed, and multilevel error diffusion processing of each of colors is performed in response to a blackening signal. For this reason, even when positional errors occur in an output printer, stable color reproduction can be obtained, and a high-quality image free from moire noise or texture noise can be obtained. In addition, even when a printer having printer characteristics in which color reproduction is degraded by tone characteristics or color stacking is used, a signal of only a stable portion is used as a control signal to obtain an extremely high-quality image. Even when a variation in color balance occurs, stable color reproduction can be advantageously obtained.

According to the third aspect of the present invention, the amount of ink actually used is determined by the image region discrimination signal and the blackening amount. For this reason, 100% undercolor removal is performed in the character region, and a clear image free from color blurring can be obtained. When the blackening amount is large, almost 100% undercolor removal is performed in the halftone image region to contribute to a decrease in ink consumption amount. When the blackening amount is small, almost only threecolor printing is performed to suppress snow noise. The weighting coefficient matrix is changed in error diffusion recording of the character region requiring high-definition recording and a recording color requiring high-definition recording. Therefore, both high-definition recording and smoothness in the halftone image region can be satisfied.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image recording apparatus for representing a halftone by use of a plurality of recorded dots, comprising:

means for nonlinear-quantizing an input image signal and forcefully setting at least one signal, having a highlight tone level higher than a predetermined highlight tone level at which a recording density is unstable, to a limited highlight tone level to output a nonlinear-quantized signal;

error diffusion processing means for subjecting the input image signal to an error diffusion process for diffusing an error in accordance with a difference between the input image signal and the nonlinear-quantized signal, and sending an error-diffusion-processed signal to said nonlinear-quantizing means to obtain a record image signal therefrom; and means for recording the record image signal obtained by said nonlinear quantizing means as an image.

2. An image recording apparatus according to claim 1, wherein said nonlinear-quantizing means comprises an unequal-interval quantization circuit for quantizing the input image signal at an unequal interval.

3. An image recording apparatus comprising:

means for nonlinear-quantizing an input image signal and forcefully setting at least one signal having a highlight tone level higher than a predetermined highlight tone level at which a recording density is unstable to a limited highlight tone level to output a nonlinear-quantized signal;

means for calculating a difference between the nonlinear-quantized signal from said nonlinear quantizing means and the input image signal to output a difference signal;

means for subjecting the input image signal to an error diffusion process for diffusing an error in accordance with the difference signal, and sending an addition signal to said nonlinear-quantizing means to obtain an record image signal therefrom; and means for recording the record image signal from said nonlinear quantizing means as an image.

4. An image recording apparatus according to claim 3, wherein said nonlinear-quantizing means comprises an unequal-interval quantization circuit for quantizing the input image signal at an unequal interval.

5. An image recording apparatus according to claim 3, wherein said calculating means comprises density conversion table means for converting the record signal into a density signal corresponding to an actual print density, and means for calculating a difference between the density signal in said density conversion table means and the input image signal.

6. An image recording apparatus according to claim 5, wherein said density conversion table means converses a plurality of pixels of the record signal into the density signal corresponding to the actual 7. An image recording apparatus comprising:

means for nonlinear-quantizing an input color image signal and forcefully setting the input color signal, having a highlight tone level higher than a predetermined highlight tone level at which a recording density is unstable, to a limited highlight tone level to output a nonlinear-quantized color image signal;

means for calculating a difference between the nonlinear-quantized color image signal obtained by said nonlinear quantizing means and the input color image signal to output a difference signal;

means for subjecting the input color image signal to an error diffusion process for diffusing an error in accordance with the difference signal, and sending the error-diffusion processed signal to said nonlinear-quantizing means to obtain a record color signal; and means for recording the record color signal obtained by said nonlinear quantizing means as a color image.

8. An image recording apparatus according to claim 7, wherein said calculating means comprises color conversion table means for converting the color record signal into a color signal corresponding to an actual printed color, and means for calculating a difference between the color signal obtained by said color conversion table means and the input color image signal.

9. An image recording apparatus comprising:

means for nonlinear-quantizing an input color image signal and forcefully setting, for each color, the input color signal, having a highlight tone level higher than a predetermined highlight tone level at which a recording density is unstable, to a limited highlight tone level to output a nonlinear-quantized color image signal;

means for calculating, for each color, a difference between a nonlinear-quantized signal obtained by said nonlinear quantizing means and the input multi-color image signal to output a difference signal;

means for subjecting the input color image signal to said nonlinear-quantizing means to obtain a record color signal therefrom; and means for recording the record color signal obtained by said nonlinear quantizing means as a color image.

10. An image recording apparatus comprising:

correction means for performing correction processing including undercolor removal to an input three-color (RGB or YMC) image signal to obtain a four-color (YMCK) image signal;

means for nonlinear-quantizing the four-color (YMCK) image signal obtained by said correction means and forcefully setting, for each color, the four-color image signal, having a highlight tone level higher than a predetermined highlight tone level at which a recording density is unstable, to a limited highlight tone level to output a nonlinear-quantized color image signal;

means for calculating, for each color, a difference between a nonlinear-quantized signal obtained by said nonlinear quantizing means and the input three-color image signal and outputting a difference signal;

means for subjecting each color of the input three-color image signal to an error-diffusion process for diffusing an error and sending an error-processed signal to said linear-quantizing means to obtain a record color signal therefrom; and means for recording the record color signal obtained by said nonlinear quantizing means as a color image.

11. An image recording apparatus comprising:

correction means for subjecting correction processing including undercolor removal to an input three-color (RGB or YMC) image signal on the basis of a discrimination result between a character/line image region and a halftone image region and a blackening amount to obtain a four-color (YMCK) image signal;

means for nonlinear-quantizing the four-color image signal obtained by said correction means, forcefully setting, for each color, the four-color image signal, having a highlight tone level higher than a predetermined highlight tone level at which a recording density is unstable, to a limited highlight tone level to output a nonlinear-quantized color image signal, and binarizing the nonlinear-quantized color image signal;

means for calculating, for each color, a difference between the binarized nonlinear-quantized signal obtained by said nonlinear quantizing means and the input three-color image signal to a difference signal;

means for multiplying a recorded signal with a weight coefficient for each color;

means for subjecting an input four-color signal to the input three-color image signal for each color and sending an error-diffusion processed signal to said linear-quantizing means to obtain a record color signal; and means for recording the record color signal obtained by said nonlinear quantizing means as a color image, wherein said correction means increases a conversion rate for converting the image signal to a blackening signal for the character/line region, and decreases the conversion rate for the halftone image region in accordance with decreasing the blackening amount.

12. An image recording apparatus according to claim 11, wherein said multiplying means changes the weight coefficient in accordance with the discrimination result between the character/line image region and the halftone image region.

13. An image recording apparatus according to claim 1, wherein said nonlinear-quantizing means including means for inputting an input image signal and forcefully setting at least one signal, having a dark tone level less than a predetermined dark tone level at which a recording density is unstable, to a limited dark tone level.

14. An image recording apparatus according to claim 3, wherein said nonlinear-quantizing means including means for inputting an input image signal and forcefully setting at least one signal, having a dark tone level less than a predetermined dark tone level at which a recording density is unstable, to a limited dark tone level.

15. An image recording apparatus according to claim 7, wherein said nonlinear-quantizing means including means for inputting an input image signal and forcefully setting at least one signal, having a dark tone level less than a predetermined dark tone level at which a recording density is unstable, to a limited dark tone level.

16. An image recording apparatus according to claim 9, wherein said nonlinear-quantizing means including means for inputting an input image signal and forcefully setting at least one signal, having a dark tone level less than a predetermined dark tone level at which a recording density is unstable, to a limited dark tone level.

17. An image recording apparatus according to claim 10, wherein said nonlinear-quantizing means including means for inputting an input image signal and forcefully setting at least one signal, having a dark tone level less than a predetermined dark tone level at which a recording density is unstable, to a limited dark tone level.

18. An image recording apparatus according to claim 11, wherein said nonlinear-quantizing means including means for inputting an input image signal and forcefully setting at least one signal, having a dark tone level less than a predetermined dark tone level at which a recording density is unstable, to a limited dark tone level.

* * * * *